United States Patent [19]
Namba et al.

[11] Patent Number: 6,030,038
[45] Date of Patent: Feb. 29, 2000

[54] SEAT STRUCTURE FOR MOTOR VEHICLE

[75] Inventors: Muneyoshi Namba, Okazaki; Kenichi Niwa, Nisshinn; Yoshihiro Morisawa, Hyogo; Kouichi Kaminaka, Toyohashi; Masanori Sugiura, Gamagouri, all of Japan

[73] Assignees: Mitsubishi Jidosha Kogyo Kabushiki Kaisha; Mitsubishi Jidosha Engineering Kabushiki Kaisha, both of Tokyo, Japan

[21] Appl. No.: 09/245,850

[22] Filed: Feb. 8, 1999

Related U.S. Application Data

[62] Division of application No. 08/816,435, Mar. 14, 1997, Pat. No. 5,954,398.

[30] Foreign Application Priority Data

Mar. 14, 1995 [JP] Japan ...................................... 8-85682

[51] Int. Cl.⁷ .................................................. A47C 15/00
[52] U.S. Cl. ............... 297/257; 297/378.12; 297/378.13; 297/64
[58] Field of Search ................................ 297/257, 63, 64, 297/66, 108, 111, 15, 234, 240, 243, 378.1, 378.12, 378.13, 378.14; 296/63, 66, 69

[56] References Cited

U.S. PATENT DOCUMENTS 5,542,745  8/1996  Takeda et al. .
5,741,046  4/1998  Leuchtmann et al. .

FOREIGN PATENT DOCUMENTS

| | | | |
|---|---|---|---|
| 626290 | 11/1994 | European Pat. Off. | .......... 297/378.12 |
| 46-4489 | 2/1971 | Japan . | |
| 164819 | 10/1982 | Japan | ........................ 297/64 |
| 57-164819 | 10/1982 | Japan . | |
| 58-183321 | 10/1983 | Japan . | |
| 8183321 | 10/1983 | Japan | ............... 297/378.13 |
| 59-94934 U | 6/1984 | Japan . | |
| 59-94935 U | 6/1984 | Japan . | |
| 59-102442 U | 7/1984 | Japan . | |
| 9102442 | 7/1984 | Japan . | |
| 61-157448 | 7/1986 | Japan . | |

OTHER PUBLICATIONS

Patent Abstracts of Japan—Abstract for JP 57–205239 A, published Dec. 16, 1982.
Patent Abstracts of Japan—Abstract of JP 7–257256 A, published Oct. 9, 1995.

*Primary Examiner*—Laurie K. Cranmer

[57] ABSTRACT

A seat structure for a motor vehicle includes a front seat having a seat back capable of reclining backward, and a rear seat comprising a seat back capable of reclining forward and a seat cushion. In this seat structure, the seat cushion of the rear seat is pivotably supported at a front end, lower portion thereof by a vehicle body through a pivotal support member, such that the seat cushion is rotatable about an axis of the pivotal support member to be flipped over and stored above a floor panel in front of the rear seat. The seat back of the rear seat is pivotably supported at a lower portion by a vehicle body, and is able to recline forward after the seat cushion of the rear seat is rotated and stored, so as to be located in an original position of the seat cushion. When the seat back of the front seat is leaned backward, and the seat back of the rear seat is leaned forward to be in the original position of the seat cushion, the seat back of the front seat and the seat back of the rear seat cooperates with a load-carrying platform behind the rear seat to form a substantially continuous plane.

5 Claims, 18 Drawing Sheets

SEAT STRUCTURE FOR MOTOR VEHICLE

This application is a divisional of application Ser. No. 08/816,435, filed on Mar. 14, 1997, now U.S. Pat. No. 5,954,398 the entire contents of which are hereby incorporated by reference.

FIELD OF THE INVENTION

The present invention relates to a seat structure for a motor vehicle, and in particular to such a seat structure wherein a seat or seats may recline forward or backward as needed to provide a flexible and effective space in an interior compartment of the vehicle.

BACKGROUND OF THE INVENTION

Conventionally, when a motor vehicle is loaded with a large quantity of loads or a load with a considerably large length, a seat back of its rear seat is folded onto the upper face of a seat cushion of the rear seat, so as to expand a load-carrying platform or cargo deck. Further, Publication No. 46-4489 of examined Japanese Utility Model Application discloses a technique for further expanding the load-carrying platform, by rotating the seat cushion forward about a hinge provided at its front end, lower portion to bring it into an upright position, and then leaning the seat back forward so that the rear seat provides a flat plane that is substantially flush with the load-carrying platform behind the rear seat.

In addition, Publication No. 2-5613 of examined Japanese Patent Application discloses a double hinge structure including a link mechanism in which one end of a link arm is connected to the front, lower portion of the seat cushion to be rotated, and the other end of the link arm is provided on a seat floor and pivotally supported by the floor. With this double hinge mechanism, the seat may be selectively placed in a seating position for normal use in which the seat cushion is kept in a substantially flat state, or a first folded position in which the seat back is rotated or leaned forward onto the upper face of the seat cushion and kept in the folded state, or a second folded position in which the seat cushion is raised to the uprighrt position and the seat back is leaned forward into a space on the seat floor that is generated by raising the seat cushion.

The above-described conventional seat structure, which is proposed to flip the seat cushion forward into an upright position, cannot form a flat, extensive load-carrying floor that extends from the rear platform or cargo deck to an instrument panel in the front part of the vehicle, thus making it difficult to mount a load having a large length in the vehicle. Also, in the known seat structure, passengers cannot lay down comfortably for a break.

In view of the above, it has been proposed to flip over the seat cushion of the rear seat and set it in position on a floor panel, and combining the rear seat with the front seat to form a more useful space in the interior compartment of the vehicle.

If the known double hinge structure, which is rotatably supported about two axes as described above, is applied for the above purpose, however, the seat cushion undergoes irregular movements when rotating about the double hinge structure, thus requiring careful operations where the seat cushion must be supported at its both sides. Thus, the operation to flip over the seat cushion becomes undesirably unsafe and complicated. Further, pivotal support portions of the double hinge structure may be damaged due to distortion thereof in the lateral direction during flipping-over of the seat cushion.

The rear seat may be divided into two sections in the ratio (6:4, for instance) that makes the width of one section larger than that of the other section. In this case, the section having the smaller width may be flipped over without causing any problem, but the other section having the larger width cannot be successfully flipped over and set in position since it may interfere with a console box or the like that protrudes toward the rear seat in the middle of the interior compartment. In this case, too, the seat structure cannot fully meet the requirement to allow the passengers to lay down on the seats.

SUMMARY OF THE INVENTION

The present invention has been developed in the light of the above-described situations. It is therefore an object of the present invention to provide a seat structure for a motor vehicle, which may be easily and safely altered as needed so that the entire front and rear seats can provide a space to allow a long load to be loaded onto the vehicle or allow passengers to lay down on the seats for a break.

The above object may be accomplished according to the principle of the present invention, which provides a seat structure for a motor vehicle, including a front seat having a seat back capable of reclining backward, and a rear seat comprising a seat back capable of reclining forward and a seat cushion, wherein the seat cushion of the rear seat is pivotably supported at a front end, lower portion thereof by a vehicle body through a pivotal support member, the seat cushion being rotatable about an axis of the pivotal support member to be flipped over and stored above a floor panel in front of the rear seat; wherein said seat back of the rear seat is pivotably supported at a lower portion by a vehicle body, and is cable of reclining forward after the seat cushion of the rear seat is rotated and stored, so as to be located in an original position of the seat cushion; and wherein when the seat back of the front seat is leaned backward, and the seat back of the rear seat is leaned forward to be in the original position of the seat cushion, the seat back of the front seat and the seat back of the rear seat cooperate with a load-carrying platform behind the rear seat to form a substantially continuous plane.

Thus, after the seat cushion of the rear seat is flipped over and stored above the floor panel in front of the rear seat, the seat back is leaned forward into the original position of the seat cushion, and the seat back of the front seat is leaned backward, so that a substantially continuous plane can be formed by the seat back of the front seat, seat back of the rear seat and the load-carrying platform or cargo deck behind the rear seat. In this arrangement, a considerably long, useful space that extends from the instrument panel to the seat back of the rear seat and further to the load-carrying platform may be obtained in the interior compartment of the vehicle. Namely, the front and rear seats cooperate with the load-carrying platform to provide a full flat, reclining seat.

The space thus obtained permits a load having a large length, such as a carpet, a pair of skis, or a surfboard, to be easily accommodated in the interior compartment of the vehicle, and also allows the passengers to comfortably lay down on the seats.

After the seat cushion of the rear seat is flipped over and stored in the space above the floor panel in front of the rear seat, only the seat back of the rear seat may be leaned forward to provide a cargo space that extends from the load-carrying platform to the back face of the front seat.

After the seat cushion of the rear seat is brought up to the front seat and placed in the upright position, only the seat back of the rear seat may be leaned forward to provide a cargo space that extends to the back face of the front seat.

DETAILED DESCRIPTION OF THE PREFERRED EMBODIMENTS

Referring to the accompanying drawings, there will be described in detail presently preferred embodiments of the present invention. It is, however, to be understood that dimensions, shapes, relative positions and other details of constituent components described in the preferred embodiments are merely mentioned for illustrative purposes only, and should not be interpreted to limit the scope of the present invention unless they are particularly specified in the description.

Figure 1A:
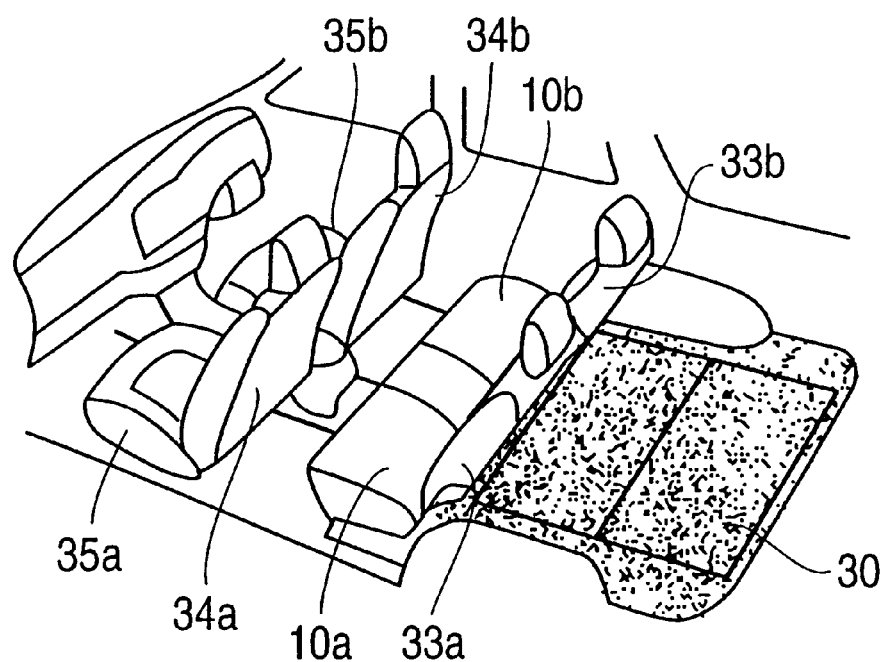
FIG. 1(A) and FIG. 1(B) are a perspective view and a schematic view, respectively, showing a seat arrangement in an interior compartment of a motor vehicle when the seat structure according to the present invention is normally used.
Figure 1B:
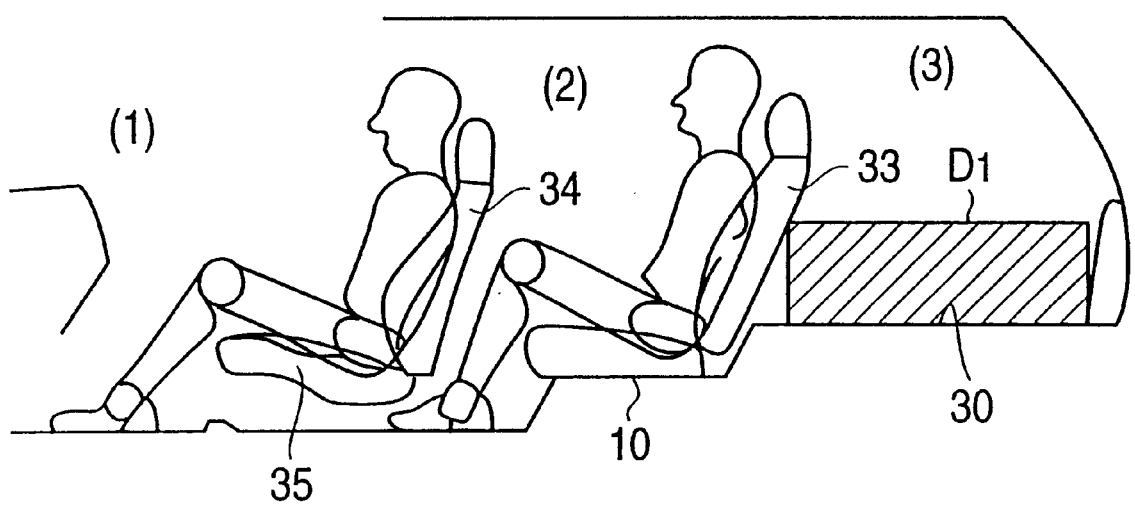

FIGS. 1(A) and 1(B) show the layout of a seat structure for a motor vehicle according to one embodiment of the present invention when seats are in a normal seating condition. As shown in FIG. 1(B), the vehicle seat structure of the present embodiment consists of a front seat (1), a rear seat (2), and a rear load-carrying platform or a cargo deck (3). The front seat (1) consists of a seat back 34 and a seat cushion 35. Actually, the front seat (1) includes a front passenger's seat consisting of a seat back 34a and a seat cushion 35a, and a front driver's seat consisting of a seat back 34b and a seat cushion 35b, as shown in FIG. 1(A) These seat backs 34a, 34b can be reclined toward the rear seat (2).

The rear seat (2) consists of a seat back 33 and a seat cushion 10 constructed according to the present embodiment. This rear seat (2) is divided into right and left sections (arranged in the width direction of the vehicle) in the ratio of 6:4, as shown in FIG. 1(A). Namely, in the present embodiment, the ratio of the first section of the rear seat (2) behind the front driver's seat (a larger section of the seat cushion) to the second section thereof behind the front passenger's seat (a smaller section of the seat cushion) is 6:4. The first section of the rear seat (2) behind the front passenger's seat consists of a seat back 33a and a seat cushion 10a, and the second section behind the front driver's seat consists of a seat back 33b and a seat cushion 10b. The postures of these right and left sections of the seat thus divided can be controlled independently of each other. The seat back 33a and seat cushion 10a of the second section of the rear seat (2) behind the front passenger's seat has substantially the same width as the seat back 34a and seat cushion 35a of the front seat (1).

The rear load-carrying platform (3) has a load-carrying floor or a deck 30 which can carry a load D1 thereon, as shown in FIG. 1(B).

In the following, there will be described the construction of the seat back 33a and seat cushion 10a of the second section of the rear seat behind the front passenger's seat.

Figure 2:
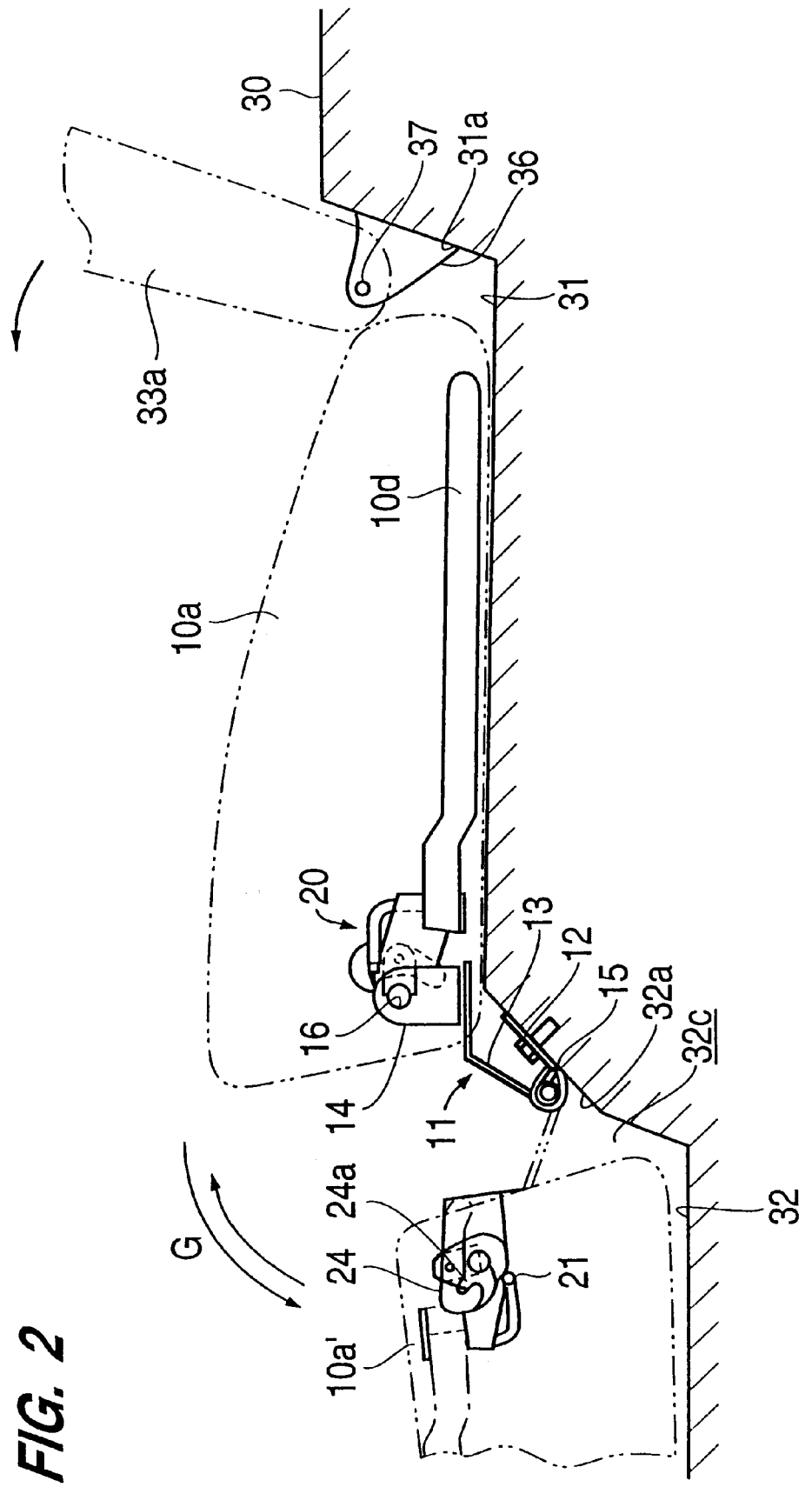
FIG. 2 is a side view generally showing the interior construction of a seat cushion of a rear seat on the side of a passenger's seat, and also showing a change in the posture of the seat cushion between the seating position and the reversed/stored position.

Referring to FIG. 2, which shows a side view of the rear seat (2) behind the front passenger's seat, the seat back 33a is pivotably supported about a rotary shaft 37 that connects a pair of brackets 36 fixed to a raised face 31a of a floor (rear seat cushion floor) 31 of the rear seat (2), such that the seat back 33a can recline forward. The thickness of the seat back 33a and the shape of its back face are selected so that the seat back 33a, upon reclining forward as will be described later, cooperates with the load-carrying floor 30 to form a flat floor.

Figure 3:
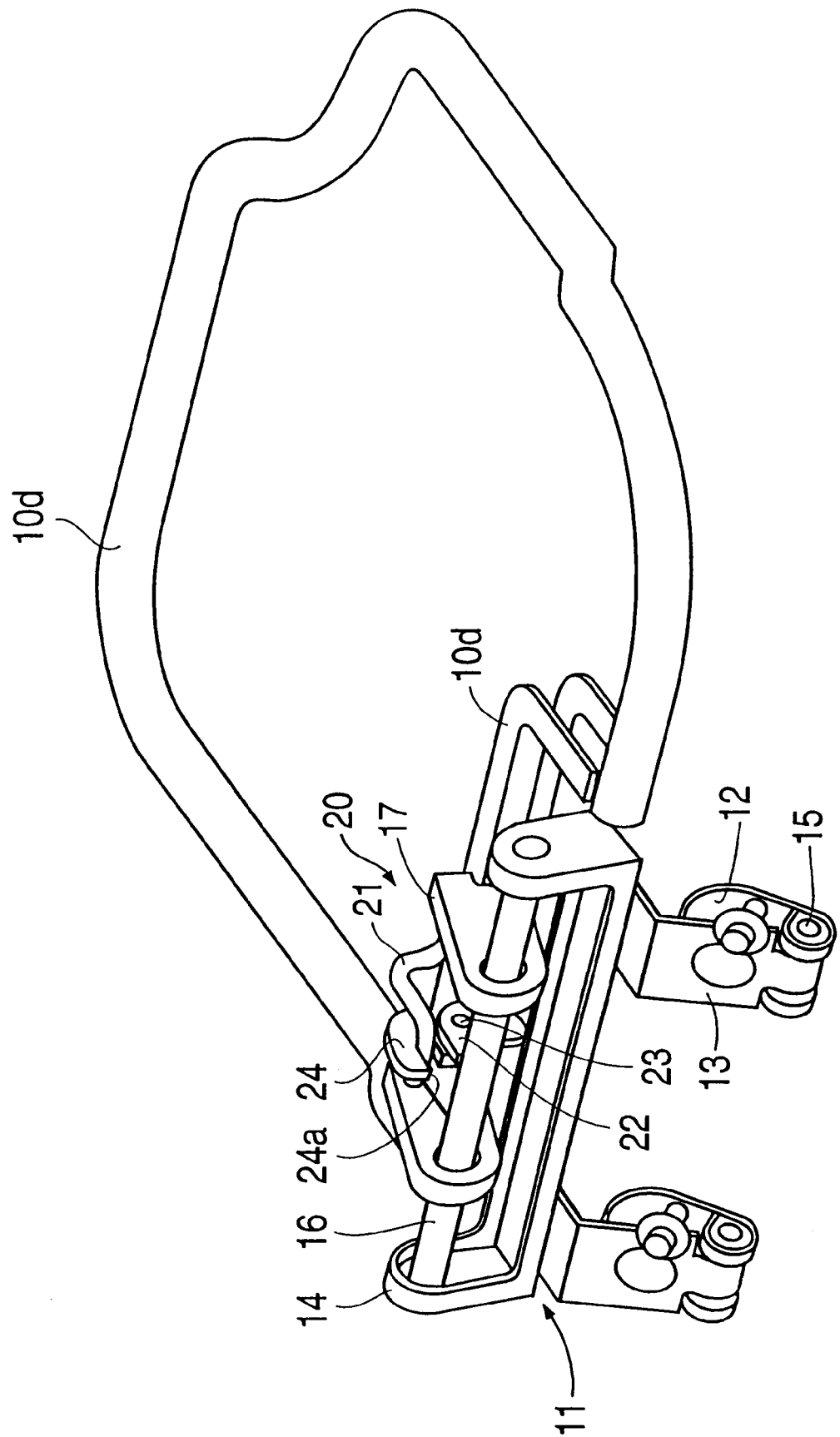
FIG. 3 is a perspective view showing a relationship between a flip-over double hinge mechanism of the seat cushion when placed in the seating position of FIG. 2, and its lock mechanism.

The seat cushion 10a incorporates a seat frame 10d that forms a frame of the sheet, as shown in FIG. 2. This seat frame 10d is provided with a flip-over double hinge mechanism (pivotal support member) 11 equipped with a lock mechanism 20, as shown in FIGS. 2 and 3. This flip-over double hinge mechanism 11 is fixedly attached to a raised face 32a of a floor panel 32 in front of the rear sheet. Thus, the seat cushion 10a is constructed such that the cushion 10a can flip over about the flip-over double hinge mechanism 11 toward the floor panel 32 in front of the rear sheet, as shown in the arrow G of FIG. 2.

More specifically described by referring to FIGS. 2 and 3, the above-indicated double hinge mechanism 11 includes fixed brackets 12 fixedly attached to the raised face 32a, hinge shafts (second hinge, fourth hinge) 15 supported along their axis by the fixed brackets 12, and substantially V-shaped hinge brackets (support member) 13 whose lower ends are rotatably supported by the hinge shafts 15. The double hinge mechanism 11 further includes a support bracket 14 fixed to the upper ends of the hinge brackets 13, a hinge shaft (third hinge, fifth hinge) 16 supported at its axial ends by the bracket 14 so as to extend in parallel with the hinge shafts 15, and connecting bars 17 rotatably supported by the hinge shaft 16. The connecting bars 17 are fixed to a front edge of the seat frame 10d.

The lock mechanism 20 includes a substantially U-shaped arm member 21 fixed to the seat frame 10d, an engaging claw 24 adapted to engage with the arm member 21 to lock the rotation of the frame 10d about the hinge shaft 16, and a retainer bracket 22 fixed to the hinge shaft 16. The engaging claw 24 is rotatably supported by a rotary shaft 23 fitted in the retainer bracket 22.

When the seat cushion 10a is placed on the floor 31 of the rear sheet (2) as shown in FIGS. 2 and 3, the engaging claw 24 is kept in a position where its engaging groove 24a engages the arm member 21 unless an external force is exerted on the engaging claw 24, whereby the locked condition is maintained. In this case, the seat frame 10d is not rotated about the hinge shaft 16, and is only rotatable about the hinge shafts 15. On the other hand, if an external force is applied to the engaging claw 24, for example, by pushing the rear end of the claw 24, the engagement between the engaging groove 24a and the arm member 21 is released, and the seat cushion 10a is allowed to rotate about the hinge shaft 16.

The engaging claw 24 may be provided with a bias means so that an elastic force biases the claw 24 in a locking direction in which the engaging groove 24a engages the arm member 21. In this case, the locked condition is released or eliminated and the seat, cushion 10a is allowed to rotate about the hinge shaft 16 when an external force is exerted on the rear end of the engaging claw 24. When the engaging groove 24a engages the arm member 21 with no external force applied to the engaging claw 24, on the other hand, the locked condition is favorably maintained by the bias means, so that the seat frame 10d is favorably rotated about the hinge shafts 15 without suffering from unsafety caused by an unexpected release of the locked condition during the rotation.

In the following, the operation of the thus constructed seat back 33a and seat cushion 10a will be explained referring to FIG. 2 through FIG. 9.

Figure 4:
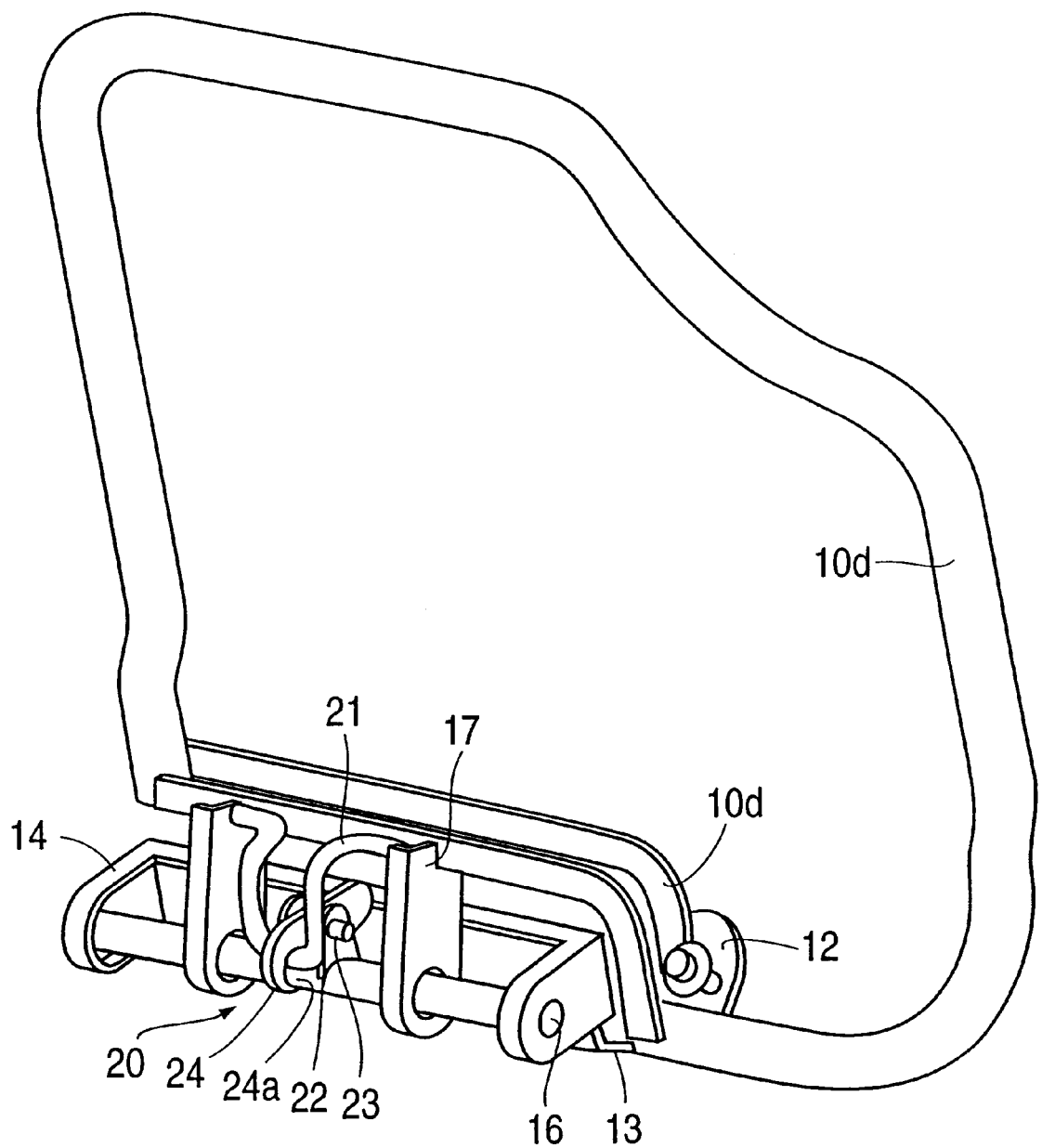
FIG. 4 is a perspective view showing a relationship between the flip-over double hinge mechanism of the seat cushion when placed in a substantially upright position, and the lock mechanism.

FIG. 4 shows one operating state of the seat frame 10d where the seat cushion 10a is rotated 90° about the hinge shaft 15 to stand upright while the engaging claw 24 is being placed in the locking position. Thus, the seat cushion 10a is initially rotated about the hinge shafts 15 until it reaches a substantially upright position, while the locked condition of the hinge shaft 16 is being maintained.

Figure 6:
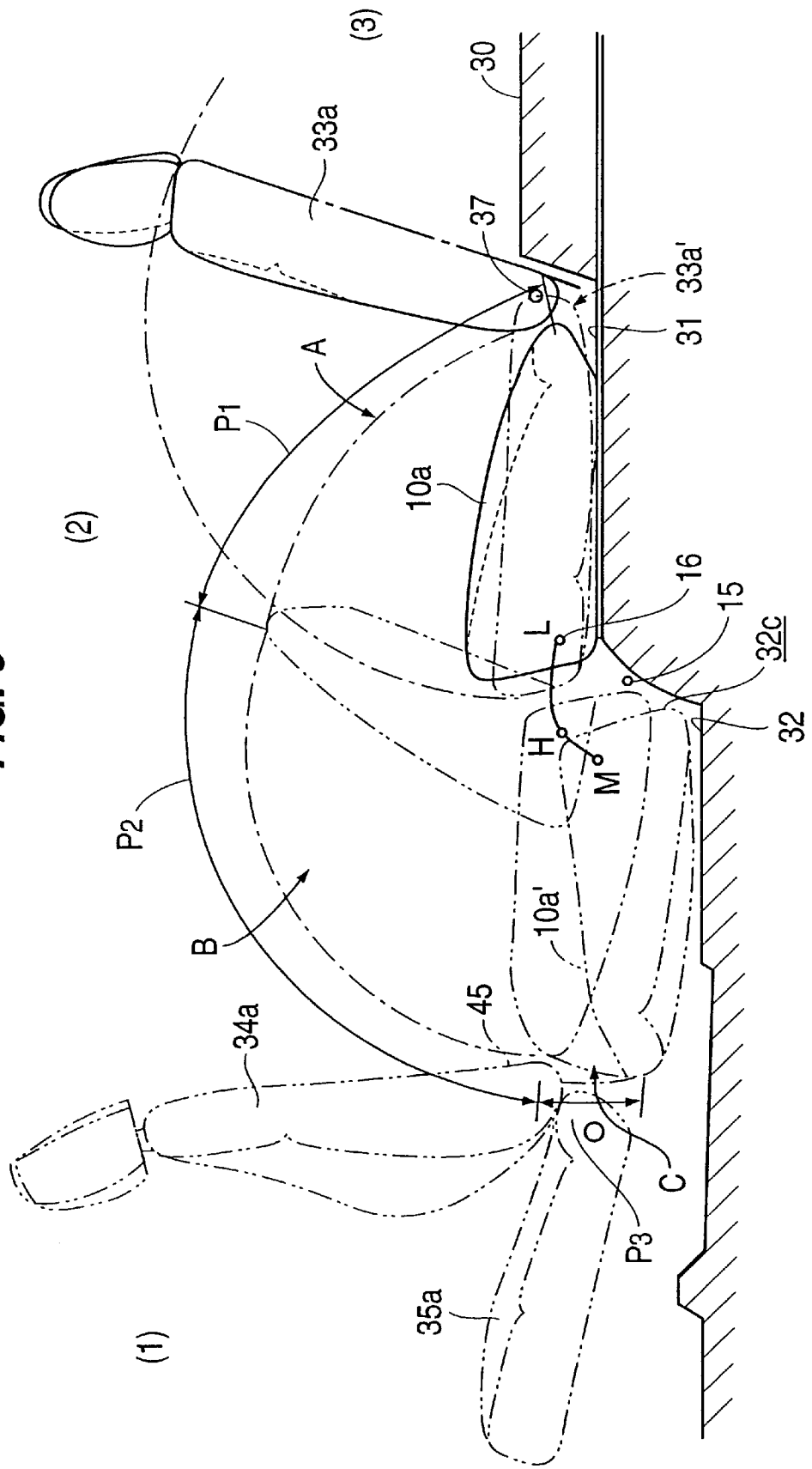
FIG. 6 is a view showing rotating operations conducted to flip over the seat cushion of the rear seat on the side of the passenger's seat, along with trajectories obtained by the rotating operations.

The seat cushion 10a is rotated about the hinge shafts 15 with a larger radius than that of rotation about the hinge shaft 16, and the axis of the hinge shafts 15 is located lower (closer to the floor panel) and closer to the front seat (1) than the axis of the hinge shaft 16. Thus, the seat cushion 10a is arcuately rotated along a trajectory A, as shown in FIG. 6, such that it becomes closer to the front seat (1) and also to the floor panel 32. In this condition, the hinge shaft 16 is also rotated about the hinge shaft 15 (from the position L to the position H in FIG. 6) along with the hinge brackets 13 and support bracket 14, to move toward the front seat (1) and the floor panel 32 (first operating step P1). Although a relatively large force is required in this first operating step P1 due to the rotation of the above members 16, 13, 14, the seat cushion 10a can be stably rotated only about the hinge shafts 15, rather than about two rotary axes of the hinge shafts 15 and hinge shaft 16, thus eliminating a complicated operation and assuring improved safety. In this arrangement, the flip-over double hinge mechanism 11 makes a smooth movement and is thus protected against damages.

Figure 5:
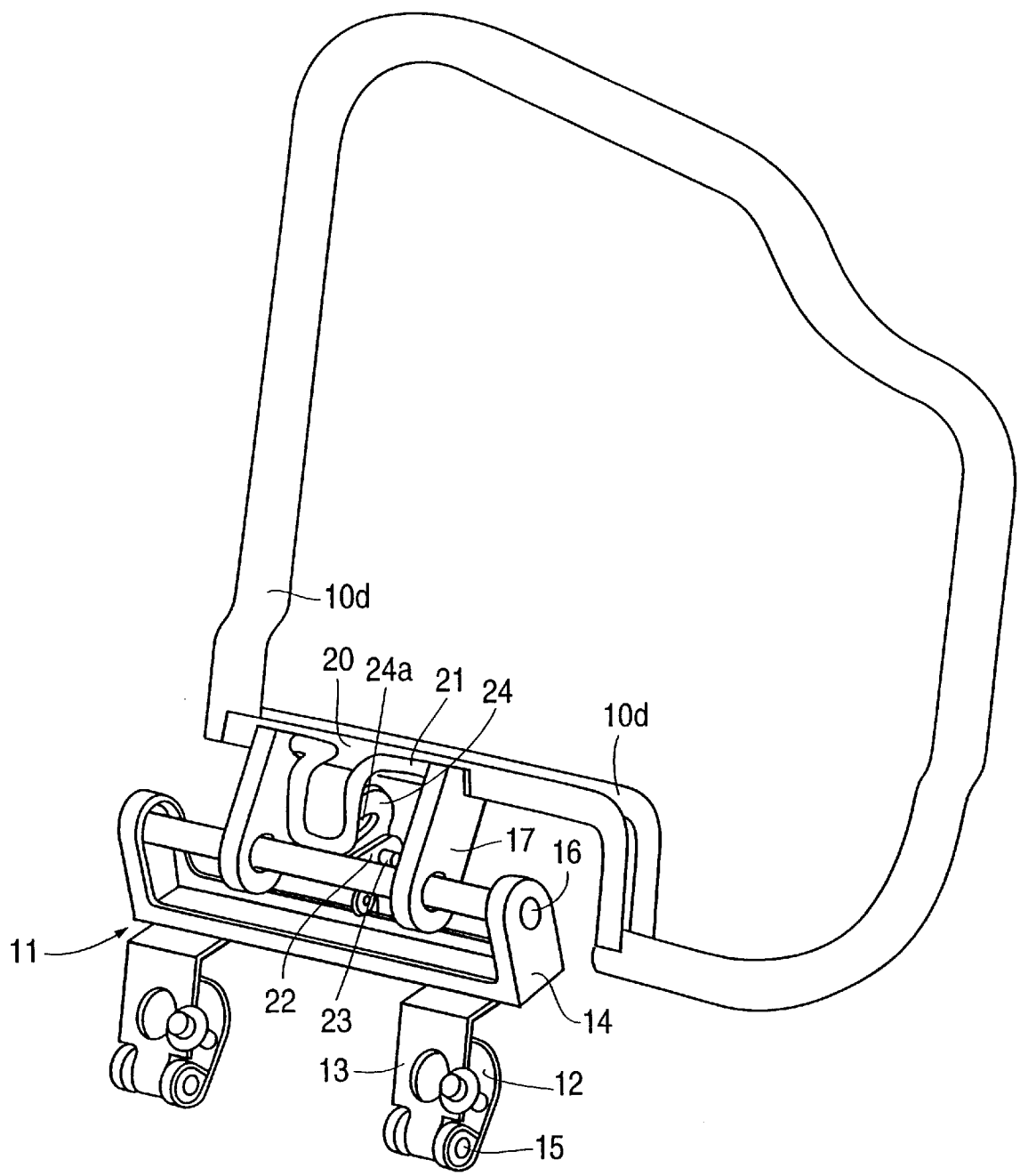
FIG. 5 is a perspective view showing a relationship between the flip-over double hinge mechanism of the seat cushion when rotated about a third hinge, and the lock mechanism that has been released.

The lock mechanism 20 is released when the seat cushion 10a reaches the substantially upright position. As shown in FIG. 5 showing the state of the seat frame 10d when the lock mechanism 20 is placed in the released position, the engaging groove 24a of the engaging claw 24 is disengaged from the arm member 21 by pushing the rear end of the engaging claw 24, for example, so that the locked condition is eliminated. As a result, the seat frame 10d, i.e., seat cushion 10a, is allowed to rotate about the hinge shaft 16 and fold down toward the floor panel 32 in front of the rear seat. At this time, the seat cushion 35a and seat back 34a of the front seat (1) are placed in the forefront positions.

Since the radius of rotation of the seat cushion 10a about the hinge shaft 16 is smaller than that of rotation about the hinge shafts 15, the seat cushion 10a is arcuately rotated about the hinge shaft 16 along a trajectory B without interfering with the back face 45 of the front seat, until the cushion 10 reaches a substantially horizontal position and is laid down above the floor panel 32 (second operating step P2).

After avoiding the interference with the back face 45 of the front seat as described above, the seat cushion 10a is further rotated about the hinge shafts 15. With this rotation, the hinge shaft 16 is finally placed in the position M shown in FIG. 6.

With the axis of the hinge shafts 15 being located closer to the front seat and lower (closer to the floor panel) than the axis of the hinge shaft 16 as described above, the seat cushion 10a is arcuately rotated along a trajectory C until it falls exactly down to the position of the floor panel 32, as shown in FIG. 6. Thus, the seat cushion 10a favorably fits in a space 32c above the floor panel 32, and can be thus placed in a reversed/stored position 10a' (third operating step P3).

Figure 7A:
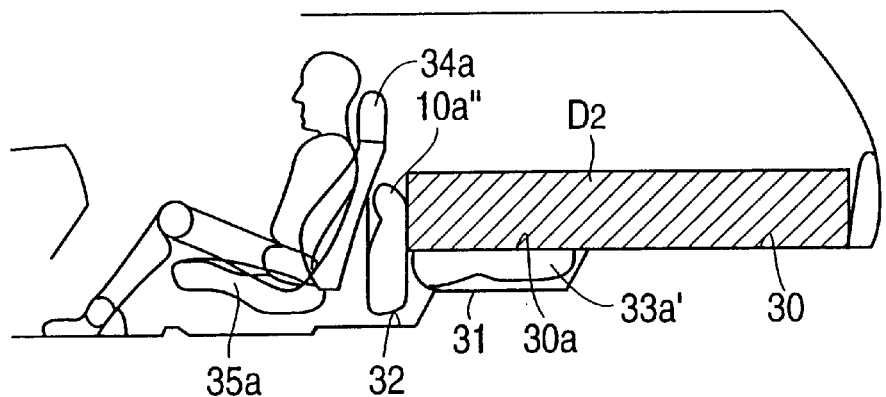
FIG. 7(A) is a schematic view showing the layout of the seat structure of the invention obtained by flipping the rear seat forward into the substantially upright position.

In the present embodiment as described above, the seat cushion 10a of the rear seat (2) can be easily and safely flipped over to fit in the space, without interfering with the front seat (a). As shown in FIG. 7(A), the seat cushion 10a of the rear seat (2) may be flipped forward to the substantially upright position 10a" only with the operation of the first operating step P1. Then, the seat back 33a may be leaned forward to the position where the seat cushion 10a was originally located (original position), to be placed in a lean-forward position 33a' as shown in FIG. 6, so that a flat back face of the seat back 33a provides a load-carrying floor 30a. Thus, the rear seat (2) can be used as a part of the load-carrying platform that also includes the load-carrying floor 30, thereby enabling a load D2 having a greater length than the above-indicated load D1 to be mounted on the load-carrying platform 30, 30a within the interior compartment.

Figure 7B:
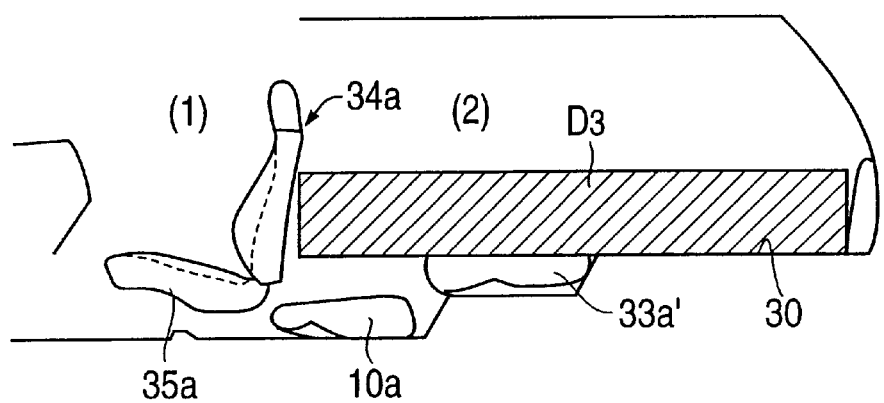
FIG. 7(B) is a schematic view showing the layout of the seat structure of the invention obtained by flipping over the seat cushion of the rear seat and storing it above the floor panel in front of the rear seat, and leaning the seat back of the rear seat forward.

By carrying out the first through third operating steps P1–P3, the seat cushion 10a of the rear seat (a) may be rotated and flipped over to be placed in the reversed/stored position 10', as shown in FIG. 7(B). Subsequently, the seat back 33a may be leaned forward to be placed in the lean-forward position 33a' so that the load-carrying floor 30 can carry thereon a load D3 having a greater length than the load D2.

Figure 7C:
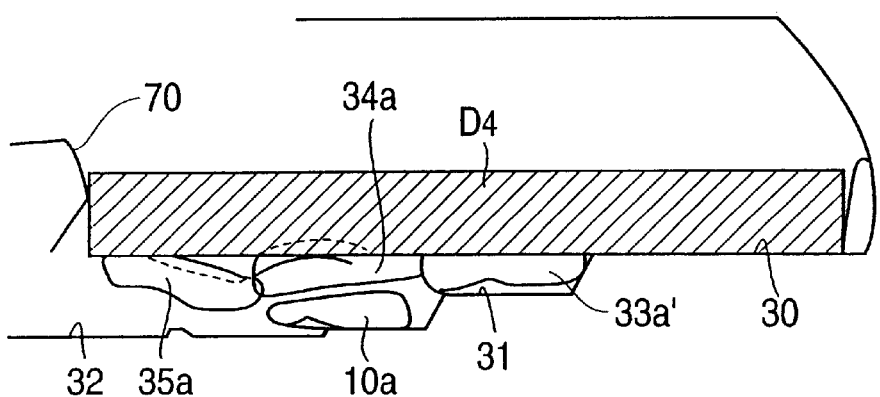
FIG. 7(C) is a schematic view showing the layout of the seat structure of the invention obtained by flipping over the seat cushion of the rear seat and storing it above the floor panel in front of the rear seat, leaning the seat back of the front seat backward, and leaning the seat back of the rear seat forward.
Figure 9:
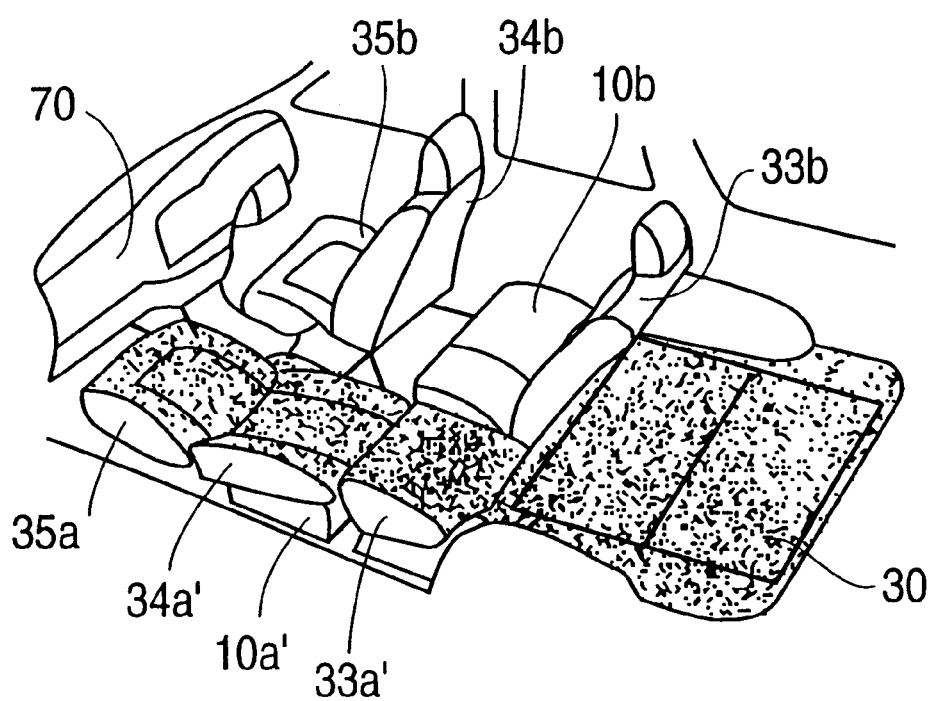
FIG. 9 is a perspective view showing the seat arrangement in the interior compartment where the front and rear seats on the side of the passenger's seat are formed into a full flat reclining seat.

In addition, the seat cushion 10a of the rear seat (2) mass be rotated and flipped over to be placed in the reversed/stored position 10', and the seat back 34a of the front seat (1) may be leaned backward by releasing a lock mechanism (not shown), to placed in a lean-backward position 34a', as shown in FIG. 7(C). The seat back 33a of the rear seat (2) is then leaned forward to be placed in the lean-forward position 33a'. Thus, the front seat (1) and the rear seat (2) may be altered to provide a fully flat reclining seat as shown in FIG. 9, so that a considerably long load D4, such as a carpet, a pair of skies or a surfboard, which extends up to an instrumental panel 70 can be mounted within the vehicle compartment.

Figure 8:
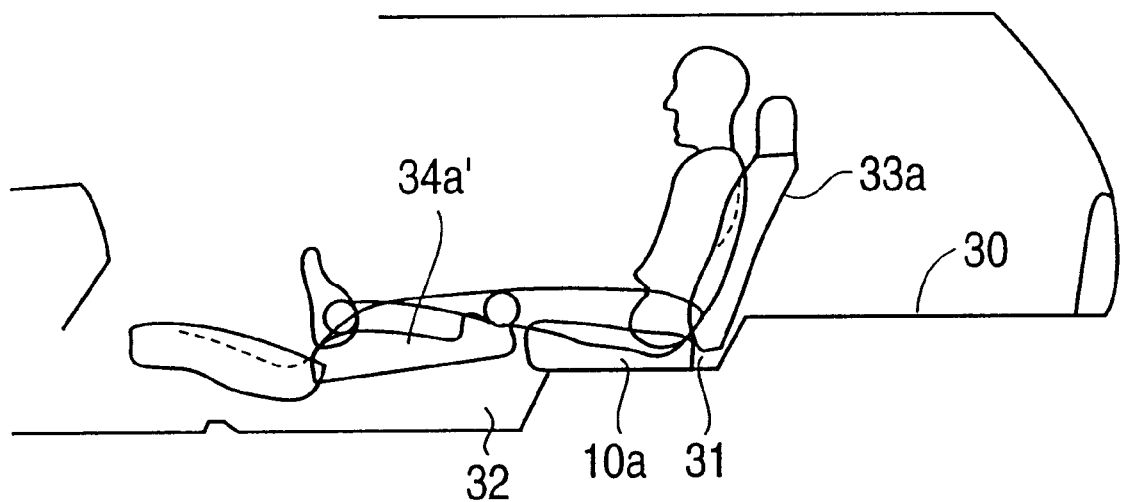
FIG. 8 is a schematic view showing the layout of the seat structure of the invention obtained by leaning the seat back of the front seat backward.

As shown in FIG. 8 only the seat back 34a of the front seat (2) may be leaned backward to be placed in the lean-backward position 34a', to provide a front-seat full flat state used when a passenger takes a break for a while.

The above-described operating steps may be carried out in the reverse order so as to return the seat cushion 10a from the reversed/stored position 10a' to the seating position.

Figure 10:
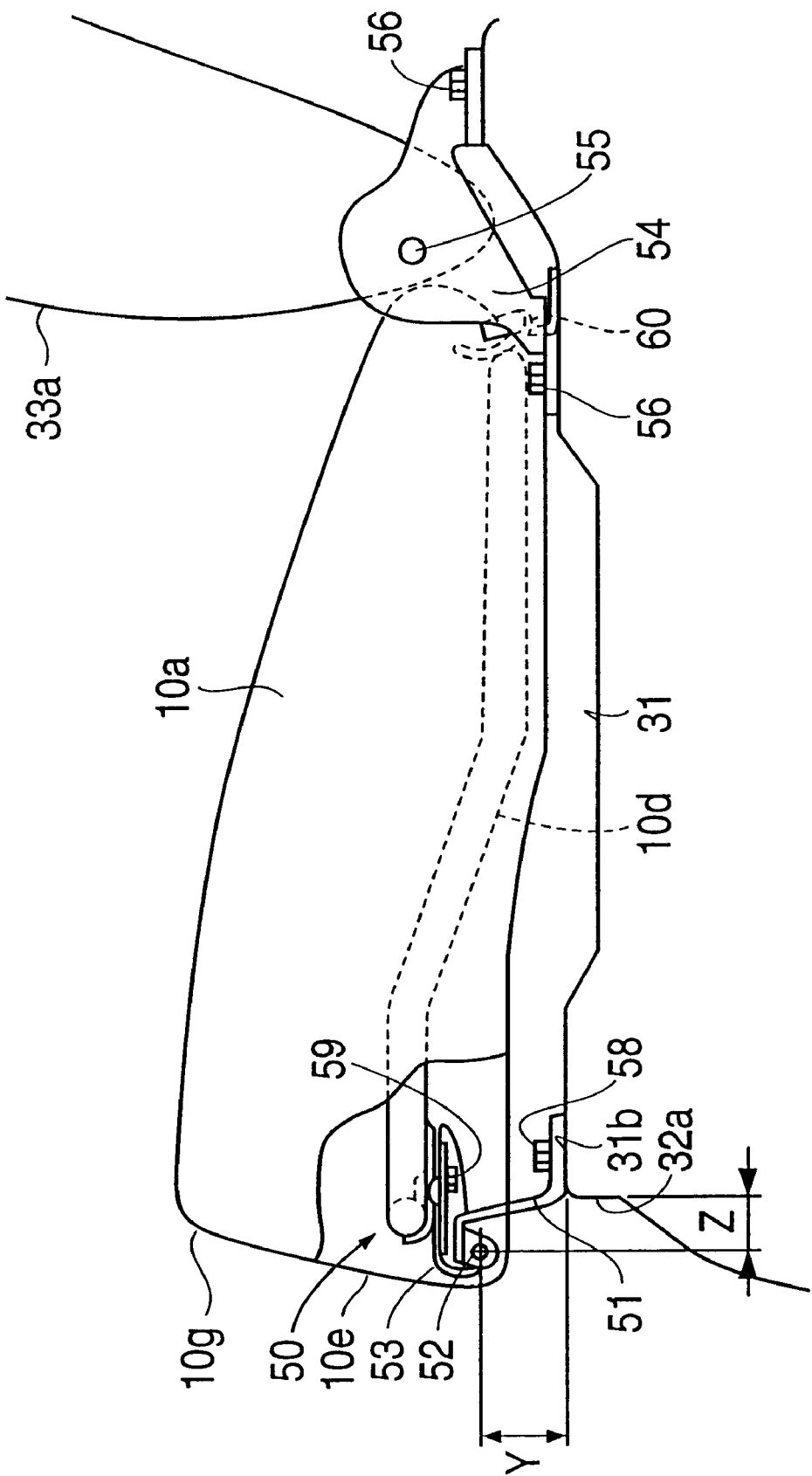
FIG. 10 is a side view of a seat cushion of a rear seat constructed according to a second embodiment of the present invention.
Figure 11:
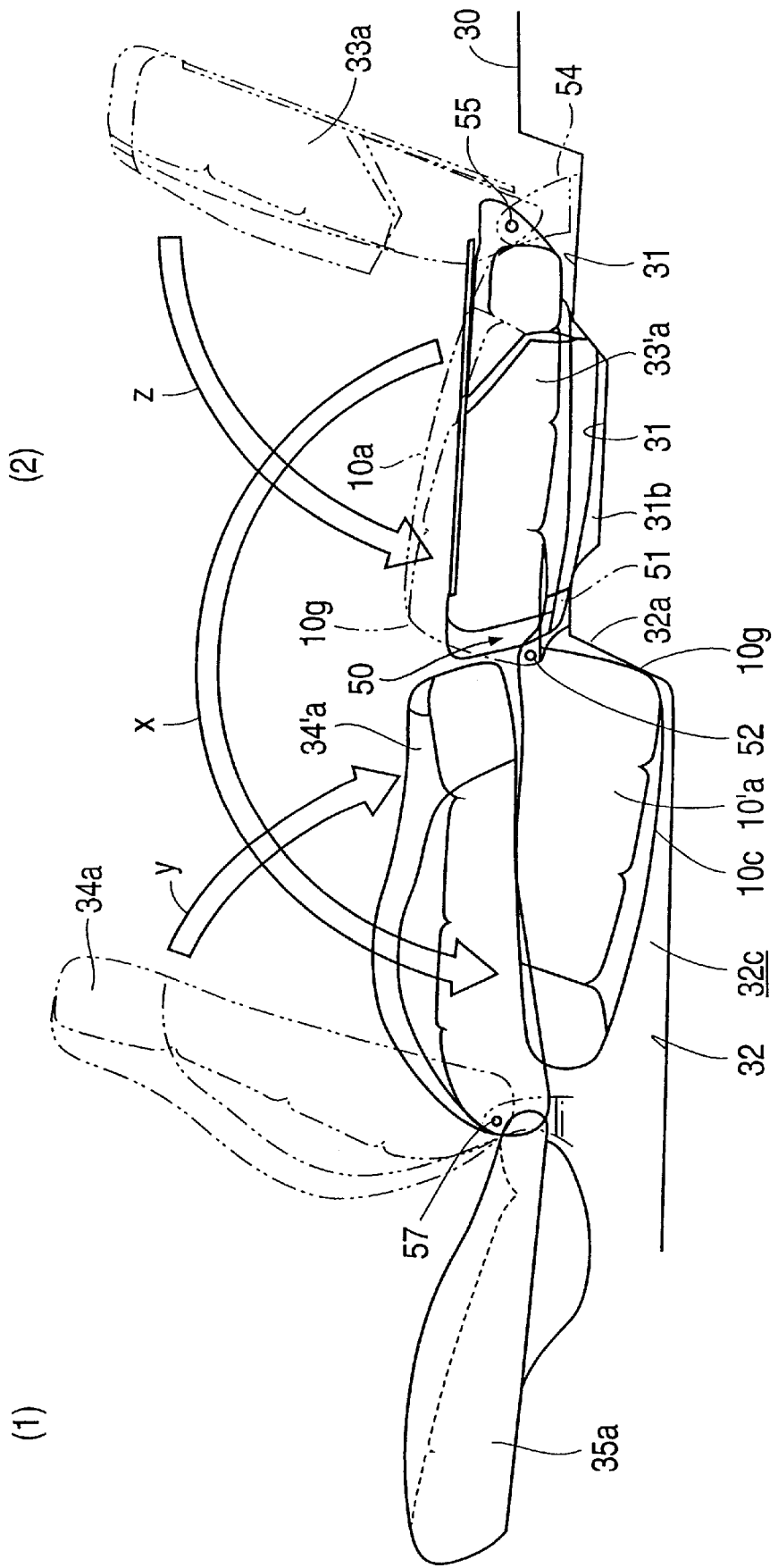
FIG. 11 is a view showing operations to rotate the rear seat and front seat according to the second embodiment.

FIGS. 10 and 11 show the construction of a seat structure for a motor vehicle according to a second embodiment of the present invention, in which a single hinge mechanism is employed in a seat cushion 10a behind a passenger's seat. Referring to these figures, the second embodiment related to the seat cushion 10a behind the passenger's seat will be explained.

The second embodiment is constructed without using two hinges (double hinge mechanism) as used in the previous embodiment, to provide a full flat reclining seat as shown in FIG. 7(C) and FIG. 9 by means of the single hinge mechanism.

Referring first to FIG. 10, a pair of single hinge devices (pivotal support members) 50 are provided instead of the above-described flip-over double hinge mechanism 11, in the front-end, lower portion of the seat cushion 10a of the rear seat (2). Each single hinge device 50 mainly consists of a fixed bracket (first bracket member) 51, a hinge shaft (first hinge) 52 fittedly inserted through the fixed bracket 51, and a hinge bracket (second bracket member) 53 that is rotatable about the hinge shaft 52. The fixed bracket 52 is secured to a front end portion 31b of a floor 31 of the rear seat (2) with a plurality of bolts 58, and the hinge bracket 53 is fixed to the seat frame 10d of the seat cushion 10a with a plurality of bolts 59. In this arrangement, the seat cushion 10 is rotatable about the hinge shaft 52.

More specifically, the fixed bracket 51 is attached to the front end portion 31b such that the axis of the hinge shaft 52 inserted through the bracket 51, i.e., the center of rotation of the seat cushion 10a, is located at a fixed height Y as measured from the front end face 31b of the floor 31, and protrudes forward by a fixed distance Z as measured from a raised face 32a on the rear side of the floor panel 32. Namely, the axis of the hinge shaft 52 is located forwardly and upwardly of the front end face 31.

The above-indicated height Y and protruding distance Z are determined so that when the seat cushion 10a of the rear seat (2) is placed in the reversed/stored position 10a' and the front seat (1) and rear seat (2) are set in the form of a full flat reclining seat, the seat cushion 10a is accommodated in the space 32c above the floor panel 32 in the following manner (refer to FIG. 11).

Namely, the above dimensions Y, Z are determined so that the seat cushion 10a is completely or fully fitted in the space 32 such that the front end face 10g of the seat cushion 10a abuts on the raised face 32a, and the back face of the seat cushion 10a is made substantially horizontal, preferably with a small clearance between the upper face 10c (in the original position) and the floor panel 32. In this arrangement, the single hinge devices 50 do not protrude from the seat cushion 10a, and are prevented from interfering with the passenger.

Reference numeral 60 in FIG. 10 denotes an engaging member mounted on the floor 31 located below the rear portion of the seat cushion 10a. The seat cushion 10a, when normally used, is retained such that its rear end portion is held onto the floor 31 by means of an engagement between the seat frame 10d and the engaging member 60. If the engagement with the engaging member 60 is released, on the other hand, the seat cushion 10a becomes rotatable about the hinge shafts 52.

In FIG. 10, reference numeral 54 denotes a pair of brackets, that support the seat back 33a like the above-indicated brackets 36, and the brackets 54 are secured to the floor 31 with bolts 56. As shown in FIG. 10, a rotary shaft 55 extends between the pair of brackets 54 to pass through the lower portion of the seat back 33a. Accordingly, the seat back 33a is pivotably supported by the rotary shaft 55 and can be leaned forward about the rotary shaft; 55.

In the following, the operation of the seat cushion 10a of the thus constructed second embodiment will be described referring to FIG. 11. Two-dot chain lines in FIG. 11 indicate the seat cushion 10a when it is normally used, and solid lines indicate the cushion 10a when it is placed in the full flat reclining state.

Initially, the engaging member 60 shown in FIG. 10 is disengaged or released from the seat frame 10d, and the seat cushion 10a is rotated about 180° about the hinge shafts 52 as indicated by the arrow x in FIG. 11, so as to be set above the floor panel 32.

As described above, the axis of the hinge shafts 52 is located ahead of the raised face 32a of the floor panel 32 by the protruding distance Z, and above the front end face 31b of the floor 31 by the height Y. Accordingly, the seat cushion 10a, when rotated about 180° about the hinge shafts 52, completely fits in the space 32c above the floor panel 32 behind the front seat (1).

Since the front portion of the seat cushion 10a normally has a relatively large thickness, the front end 10g of the upper face of the seat cushion 10a that is spaced apart from the hinge shafts 52 abuts on the raised face 32a when the seat cushion 10a is rotated about the hinge shafts 52 and accommodated in the space 32c above the floor panel 32. Thus, the seat cushion 10a is stably supported by two points, i.e., at the hinge shafts 52 and the front end 10g of the upper face, and is thus kept in a substantially horizontal state while being loosely held in the air within the space 32c such that the seating surface (in the original position) 10c does not directly contact the floor panel 32. In the second embodiment, therefore, the seating surface of the cushion is advantageously prevented from being contaminated even in such a situation that the floor panel 32 gets wet on rainy days or the like.

Subsequently, the seat back 34a of the front seat (1) is rotated about the hinge shaft 57 and leaned backward as indicated by the arrow y in FIG. 11 by releasing a lock mechanism (not shown), to rest on the back face of the seat cushion 10a that is placed in the reversed/stored position 10a'. Thus, the seat back 34a is brought into the position as denoted by 34a' in FIG. 11.

Further, the seat back 33a of the rear seat is rotated about the hinge shaft 55 and leaned forward as indicated by the arrow z in FIG. 11 by releasing a lock mechanism (not shown), to be set on the floor 31 and placed in the position as denoted by 33a' in FIG. 11.

In this manner, the seat cushion 35a and seat back 34a' of the front seat (1) and the back face of the seat back 33a' of the rear seat (2) cooperate to form a single flat plane as indicated by solid lines in FIG. 11, with the seat cushion 10a being accommodated in the space 32a above the floor panel 32, thereby to provide a full flat reclining seat similar to that shown in FIG. 9.

Thus, in the second embodiment, the seat cushion 10a is brought into the reversed/stored position 10a' in a single rotating operation by use of the single hinge devices 50 having a simple structure, rather than the flip-over double hinge mechanism 11 of the first embodiment having a complicated structure, so as to establish the form of the full flat reclining seat as shown in FIG. 9. This enables a considerably long, flat space to be further easily and smoothly formed in the interior compartment, which space extends from the instrument panel 70 to the rear end of the load-carrying floor 30.

There will be next explained the construction of a seat back 33b and a seat cushion 10b that accounts for 60% of the entire rear seat (2) and is located behind the front driver's seat.

Figure 12:
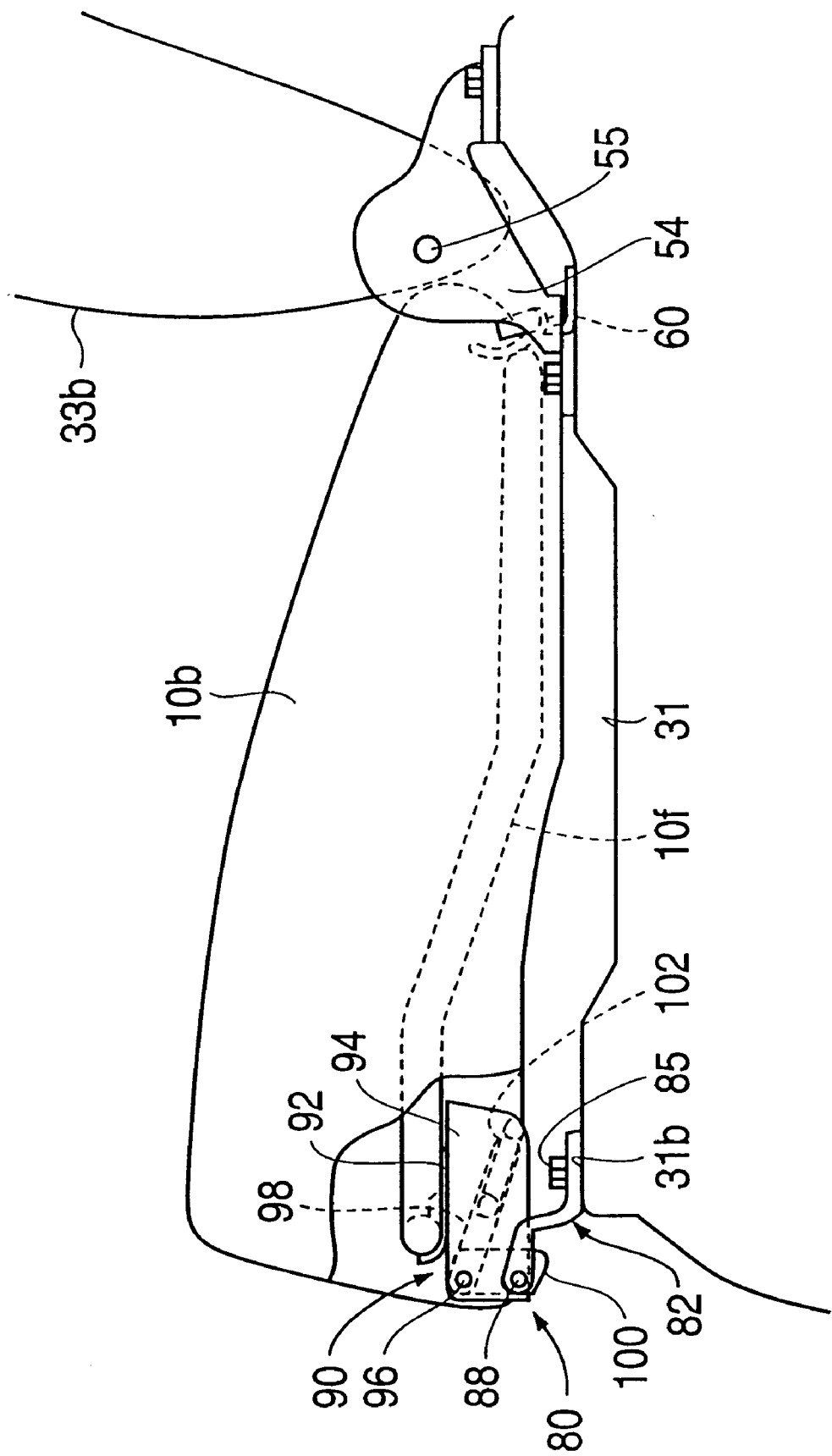
FIG. 12 is a side view showing a seat cushion of a rear seat behind the driver's seat.

Referring to FIG. 12, which shows a side view of the rear seat (2) facing the back face of the front driver's seat, the seat back 33b is pivotably supported about a rotary shaft 55 disposed between a pair of brackets 54 fixed to the floor 31 of the rear seat (2), like the seat back 33a of the second embodiment facing the back surface of the front passenger's seat. The thickness of the seat back 33b and the shape of its back face are determined so that the seat back 33b, when leaned forward, cooperates with the load-carrying floor 30 to provide a substantially flat floor. An engaging member 60 as described above is provided on the floor 31.

The seat cushion 10b incorporates a seat frame 10f that forms the frame of the seat, as shown in FIG. 12. At the front end portion of the seat frame 10f, there is provided a detachable mechanism (detachable connecting member) 80 which rotatably connects the seat frame 10f with the floor 31 under the rear seat (2), and is also capable of separating the frame 10f and the floor 31 from each other. This detachable mechanism 80 will be hereinafter described in detail.

Figure 13:
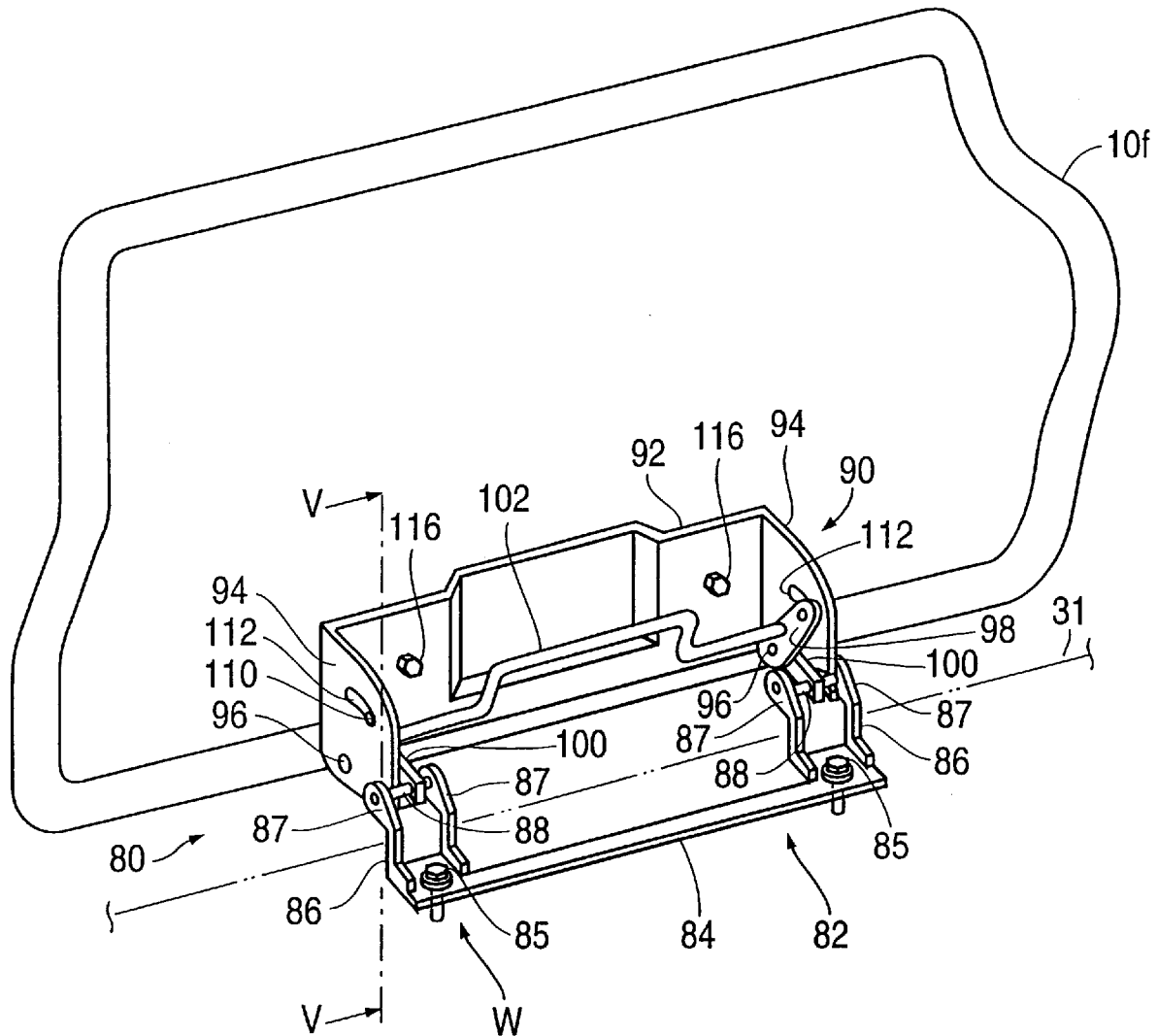
FIG. 13 is a perspective view showing a detachable mechanism for the seat cushion of the rear seat behind the driver's seat shown in FIG. 12.
Figure 14:
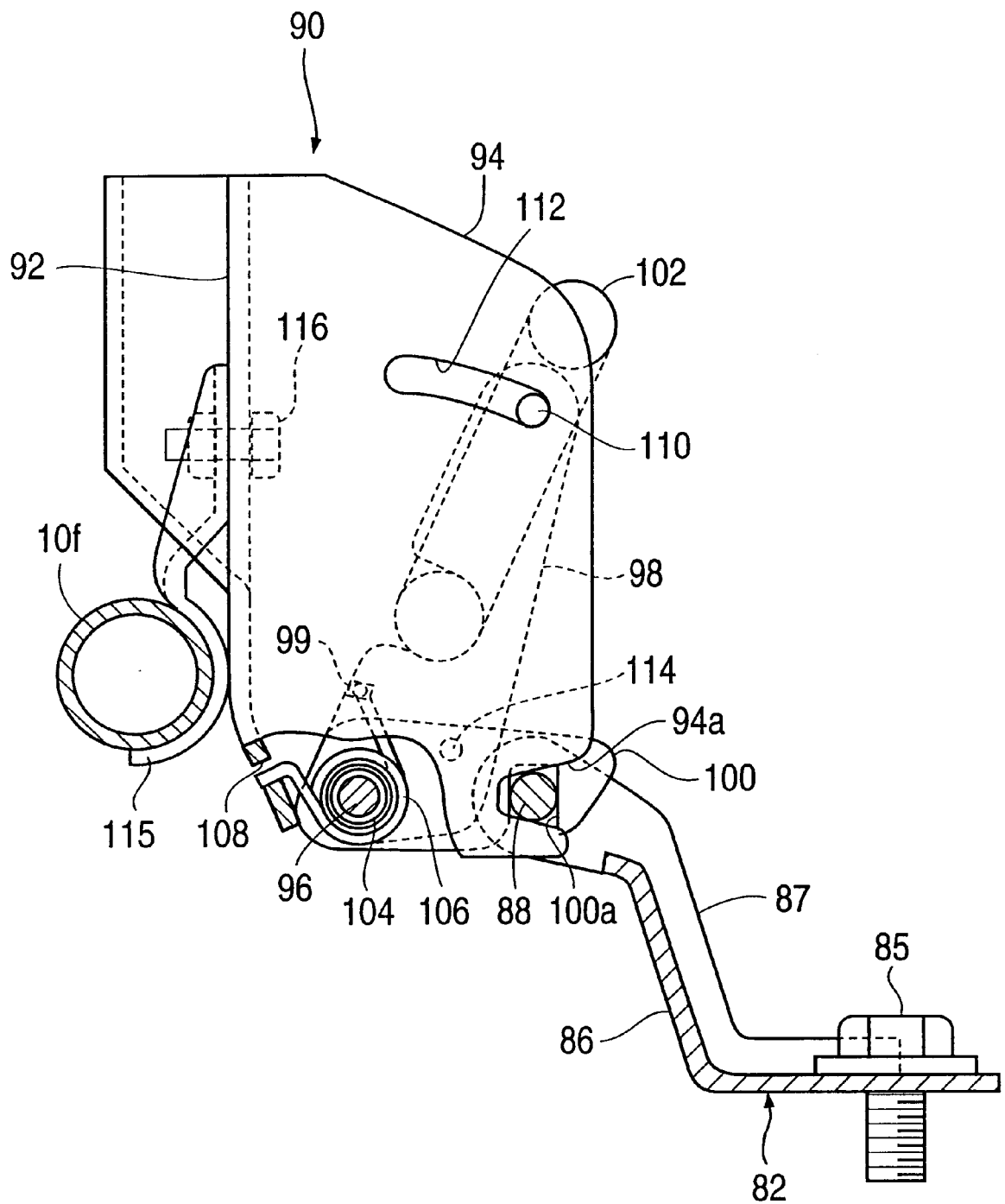
FIG. 14 is a cross sectional view of the detachable mechanism taken along V—V line in FIG. 13.
Figure 15:
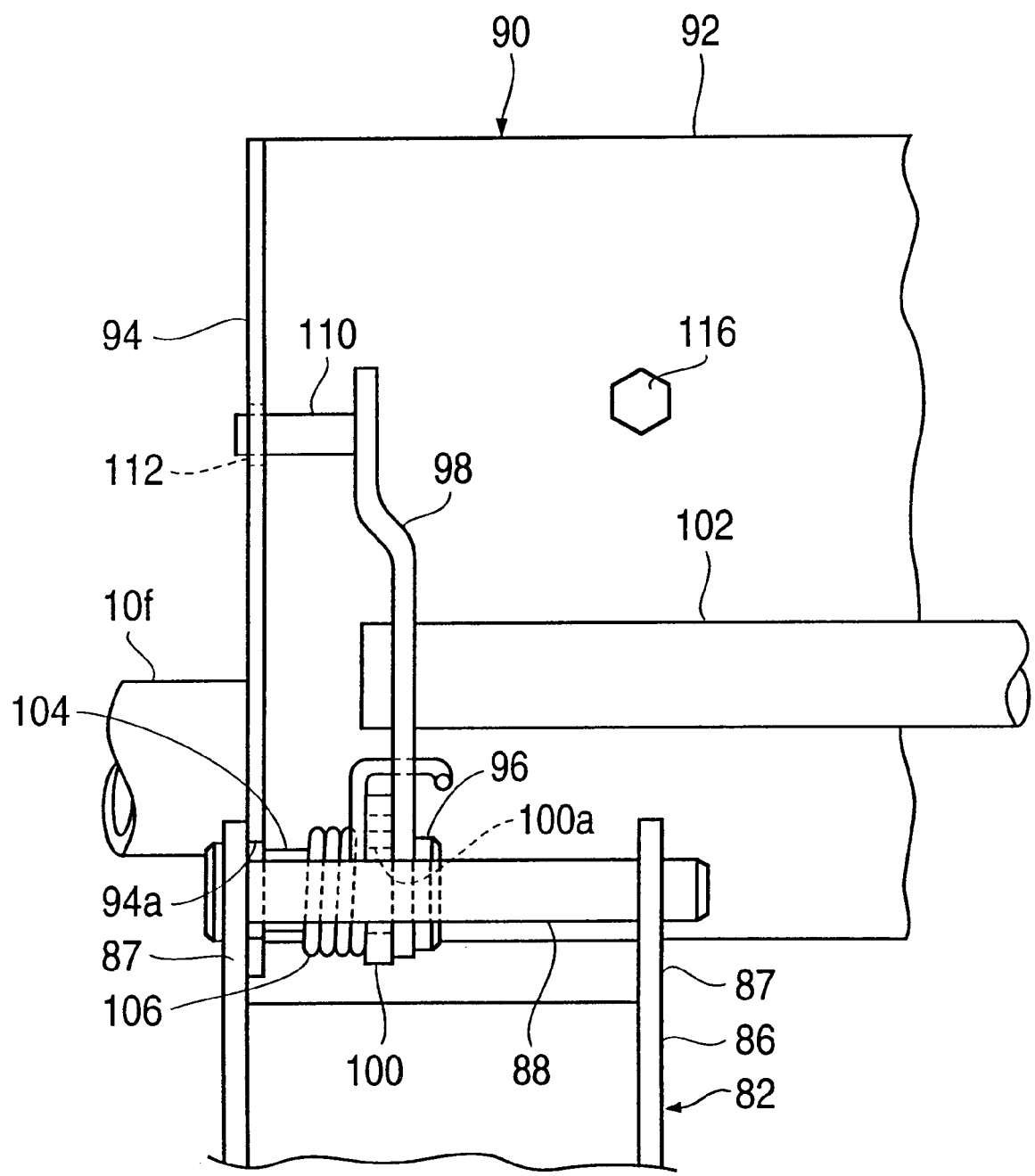
FIG. 15 is a front view of the detachable mechanism as seen in the direction of arrow W in FIG. 13.

The detachable mechanism 80 has a fixed portion 82 on the side of the floor 31, and an engaging portion 90 on the side of the seat frame 10f. FIG. 13 is a perspective view of the detachable mechanism 80 in which the seat frame 10f is rotated until the frame 10f becomes substantially vertical with respect to the floor 31. FIG. 14 is a cross sectional view of the detachable mechanism 80 taken along V—V line in FIG. 13, and FIG. 15 is a front view as seen in the direction of arrow W in FIG. 13. The detachable mechanism 80 in this operating state will be described referring to FIG. 13 through FIG. 15.

Initially, the fixed portion 82 on the side of the floor 31 consists of a fixed bracket 84 connected integrally to a pair of L-shaped brackets 86 that are spaced apart from each other, and hinge shafts 88 attached to the respective brackets 86.

More specifically, a pair of side walls 87 are formed along opposite vertical portions of each of the brackets 86, and the hinge shaft 88 extends between distal end portions of these side walls 87. The fixed bracket 84 is fixed by a plurality of bolts 85 to the front end portion 31b of the floor 31 of the rear seat (2) at horizontal portions of the L-shaped brackets 86 where these brackets 84, 86 are connected to each other.

On the other hand, the engaging portion 90 on the side of the seat frame 10f mainly includes a main plate 92 formed in U shape and fixed at its back face to the seat frame 10f, and a pair of coaxial rotary shafts 96 respectively mounted on a pair of vertical portions of the main plate 92, namely, a pair of side plate portions 94. The engaging portion 90 further includes a pair of arms 98 that are rotatable about the respective rotary shafts 96, a pair of engaging claws 100 that rotate about the rotary shafts 96 along with the arms 98, and a handle 102 having opposite ends connected to the respective arms 98 for connecting the pair of arms 98 with each other.

More specifically, as shown in FIG. 14, an engaging groove 94a is formed in one corner of the distal end of each side plate portion 94, to extend toward the corresponding rotary shaft 96, so that each of the hinge shafts 88 can fit in or engage the engaging groove 94a. Each of the engaging claws 100 is formed with an engaging groove 100a similar to the above engaging groove 94a, such that these grooves 94a, 100a are perpendicular to each other. This engaging groove 100a is also engageable with the corresponding hinge shaft 88. Namely, where the hinge shafts 88 engage the engaging grooves 94a, the hinge shafts 88 are also engageable with the engaging grooves 100a at the same time. In the operating state as shown in FIG. 13 through FIG. 15, therefore, the hinge shafts 88 are retained in the engaging grooves 94a and engaging grooves 100a, and thus the engaging portion 90 of the detachable mechanism 80 is rotatable about the hinge shafts 88. Accordingly, the detachable mechanism 80 in this state serves as a hinge, which enables the seat frame 10f, namely, the seat cushion 10b, to be freely rotated about the hinge shafts 88 of the fixed portion 82.

A stopper pin 110 is mounted on the distal end portion of each of the arms 98, to extend toward the corresponding side plate portion 94, while a guide aperture 112 is formed through each of the side plates 94. The stopper pin 110 is inserted through this guide aperture 112 such that the pin 110 can freely slide within the aperture 112. Namely, although the arm 98 is rotatable about the rotary shaft 96, the range of the rotation of the arm 98 is actually limited to the range of the movement of the stopper pin 110 within the guide aperture 112.

Reference numeral 115 denotes a lock pin that passes through the corresponding arm 98 and engaging claw 110, and permits the engaging claw 110 to be rotated together with the arm 98 about the rotary shaft 96.

Further, a sleeve 104 is fitted on each of the rotary shafts 96 to extend around the shaft 96, and a coil spring 106 is fitted on the sleeve 104. One end of this coil spring 106 is received in a notch 108 formed in the side plate portion 94, and the other end of the spring 106 is received in a notch 99 formed in the arm 98. In this arrangement, the arm 98 is always biased by the coil spring 106 within the movable range of the stopper pin 110, so that the engaging claw 100 engages the corresponding hinge shaft 88.

Reference numeral 114 in FIG. 14 denotes a bracket fixed to the seat frame 10f. The main plate 92 is coupled to this bracket 114 with a plurality of bolts 116, to be connected to the seat frame 10f.

Figure 16:
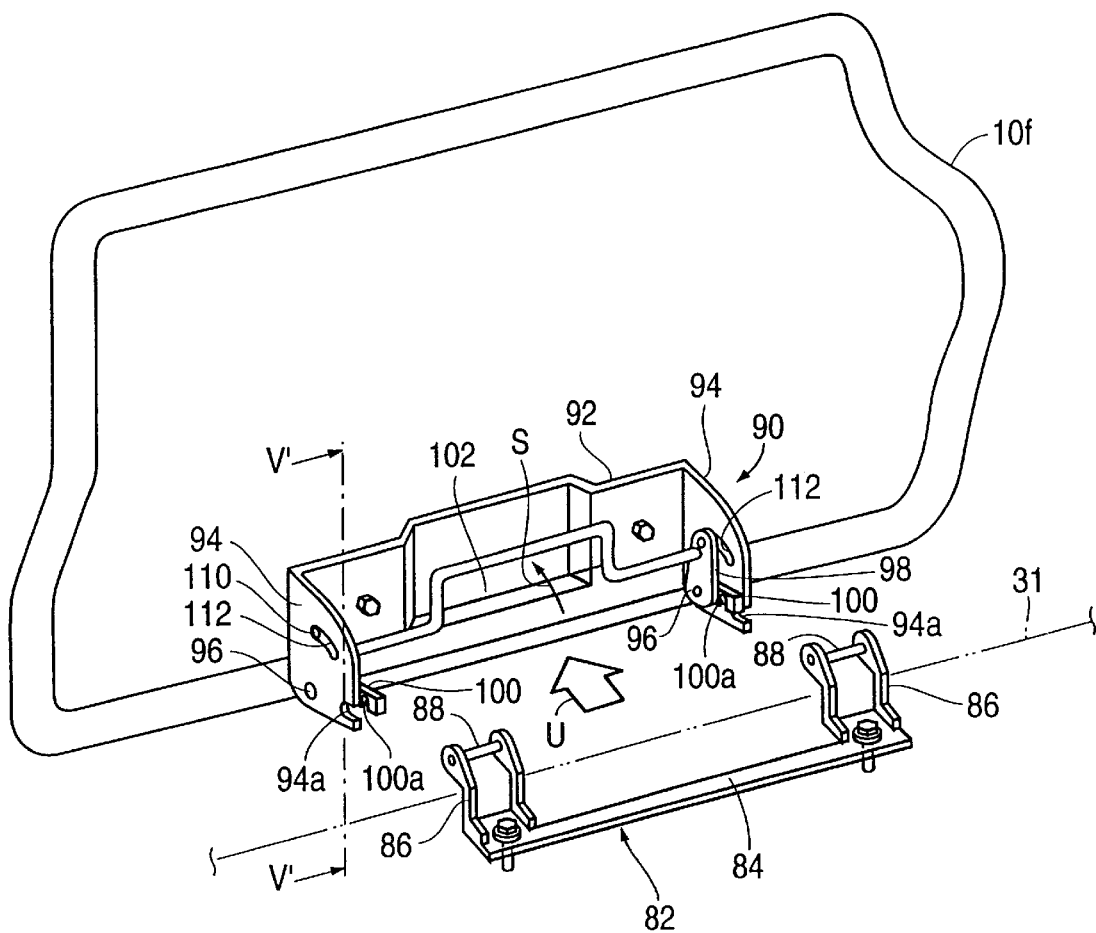
FIG. 16 is a perspective view showing the detachable mechanism when it is placed in its released or disengaged state.
Figure 17:
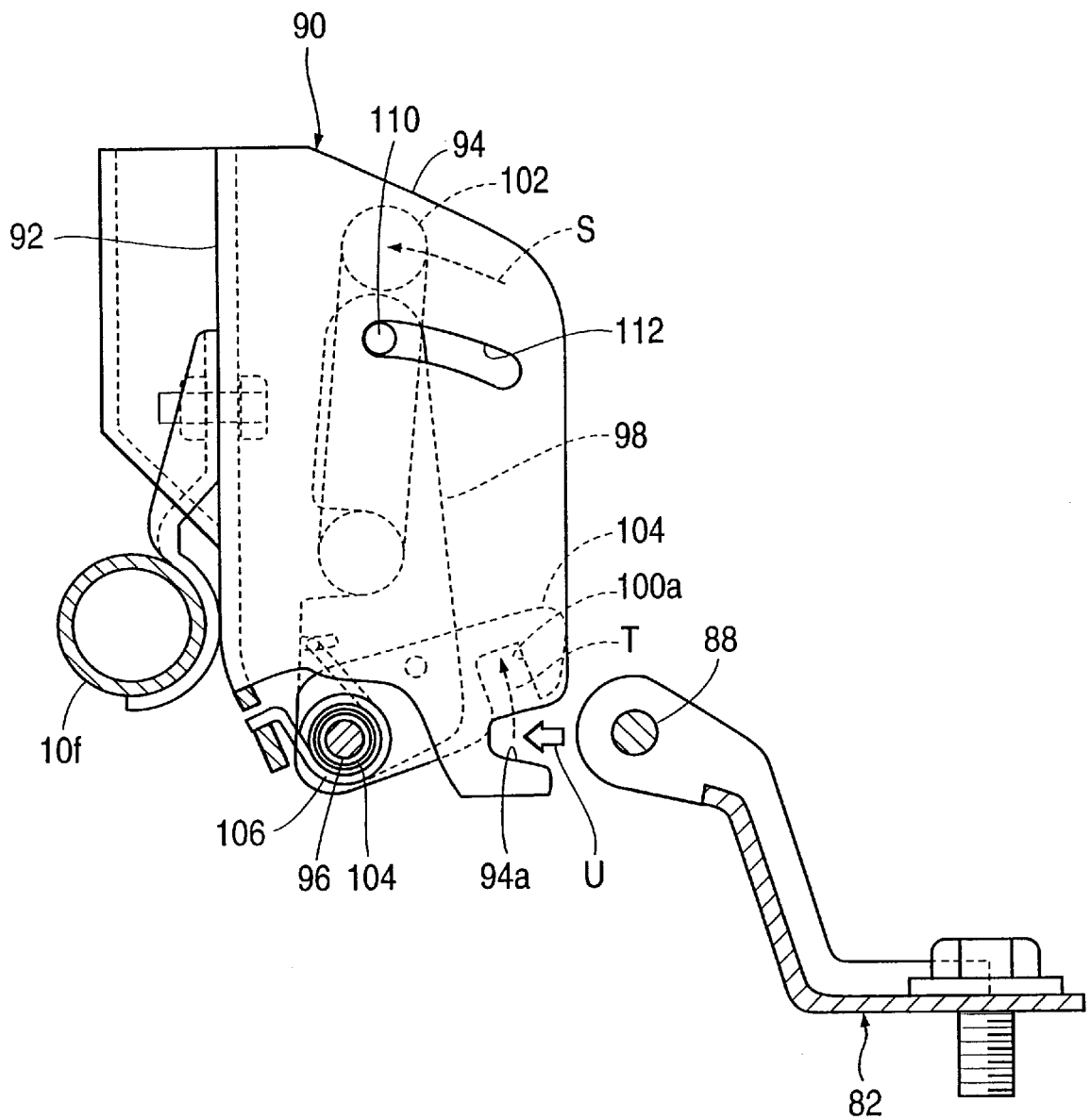
FIG. 17 is a cross sectional view of the detachable mechanism when placed in the released position, taken along V'—V' line in FIG. 16.

Referring to FIG. 12 and FIGS. 16–19, the operation of the seat cushion 10b thus constructed will be explained. FIG. 16 is a perspective view of the detachable mechanism 80 in a detached state, and FIG. 17 is a cross sectional view of the detachable mechanism 80 in the detached state, taken along V'—V' line in FIG. 18.

Figure 18:
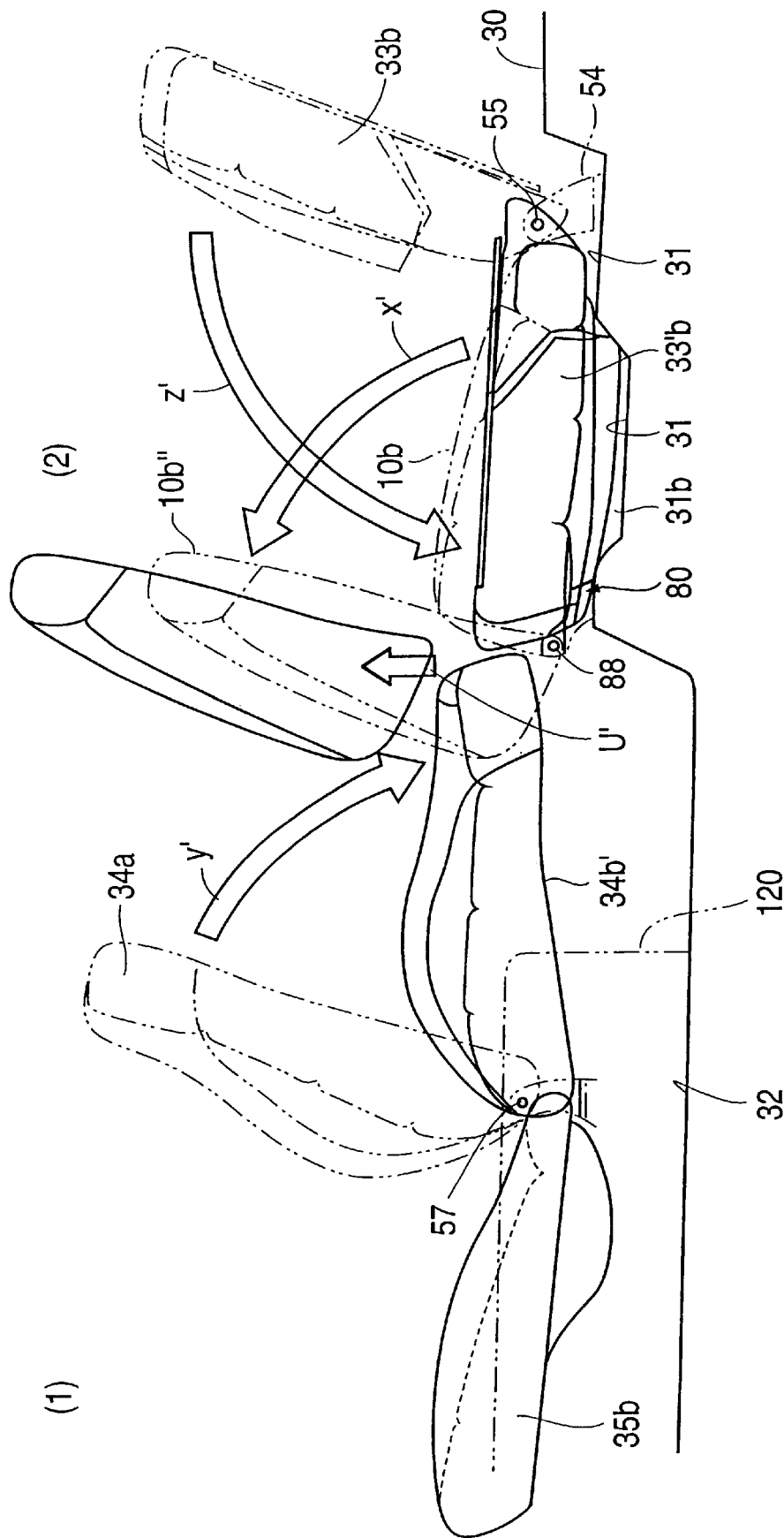
FIG. 18 is a view showing operations to change the states of the rear seat and front seat on the side of the driver's seat.

Initially, the engaging member 60 is disengaged from the seat frame 10f of the seat cushion 10b that is in the state of FIG. 12, and the seat cushion 10b is rotated about 90° along the arrow x' about the hinge shafts 88 as shown in FIG. 18, so that the cushion 10b stands up and is placed in the upright position 10b''.

In this condition, the handle 102 is then operated in the direction as indicated by the arrow S in FIGS. 16 and 17, so as to rotate the arms 98 about the rotary shafts 96 against the bias force of the coil springs 106.

As a result, the pair of engaging claws 100 connected by the lock pins 114 to the arms 98 are rotated about the rotary shafts 96 as shown in the arrow T in FIG. 17 so that the engagement between the hinge shafts 88 and the engaging grooves 100a is released. Thus, the hinge shafts 88 are detached from the engaging grooves 94a of the side plate portions 94.

In this condition, therefore, the engaging portion 90 is separated from the fixed portion 82 along the engaging grooves 94a, by holding and operating the handle 102 in the direction as indicated by the arrow U in FIGS. 16 and 17. Thus, the seat frame 10f, namely, the seat cushion 10b, is separated or removed from the floor 31, as indicated by the arrow U' in FIG. 18.

Subsequently, the seat back 34b of the front seat (1) is rotated about the hinge shaft 57 and leaned backward as indicated by the arrow y' in FIG. 18, after releasing a lock mechanism (not shown), so that the seat back 34b is brought into the position 34b' as shown in FIG. 18.

Then, the seat back 33b is rotated about the hinge shaft 55 and leaned forward as indicated by the arrow z' in FIG. 18, after releasing a lock mechanism (not shown), so that the seat cushion 10b is set on the floor 31 from which the seat cushion 10b is removed. Thus, the seat back 33b is placed in the position (state) 33b' as shown in FIG. 18.

Figure 19:
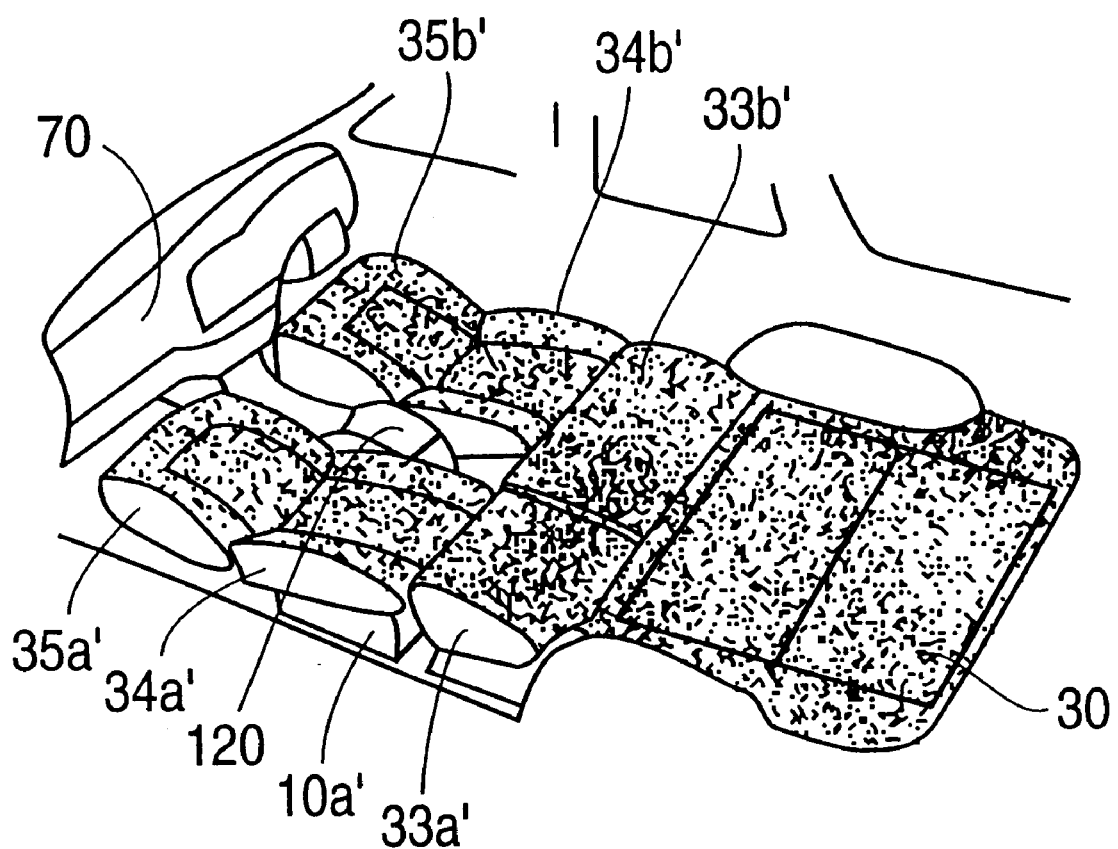
FIG. 19 is a perspective view showing the seat arrangement in the interior compartment when the front and rear seats on the driver's side and the front and rear seats on the passenger's side are arranged to provide full flat reclining seats on the both sides.

As a result, the seat cushion 35b and seat back 34b' of the front seat (1) and the seat back 33b' of the rear seat (2) form a single flat plane as indicated by solid lines in FIG. 18, to thus provide a full flat reclining seat on the side of the front driver's seat as well as on the front passenger's seat, as shown in FIG. 19.

In this connection, the seat cushion 10b having a large dimension in the width direction of the vehicle, specifically, 60% of the entire width of the rear seat, reaches a substantially middle part of the interior compartment. Where a console box 120 or the like on the floor of the substantially middle part of the interior compartment protrudes toward the rear seat (2) as shown in FIG. 18, for example, the seat cushion 10b cannot be normally flipped over and stored just above the floor panel 32 like the seat cushion 10a on the side of the front passenger's seat, because of the console box 230 or the like that interferes with the cushion 10b. In the present embodiment, the seat cushion 10b is removed in the manner as described above, to easily produce the fully flat reclining seat.

This arrangement enables the driver to lay down while the vehicle is stopped, for example. FIG. 19 shows full flat reclining seats provided on both sides of the front driver's seat and the front passenger's seat. With the seats reclining in this way, at least two people can lay down while the vehicle is stopped, thus permitting the use of the vehicle as a camping car. Depending upon situations, the seats on the side of the front passenger's seat may be kept in the normal, seating positions, and only the seats on the side of the front driver's seat may be leaned to provide a full-flat reclining seat. Further, the seat cushion 10b and seat back 33b behind the front driver's seat may be placed in the positions as shown in FIGS. 7(A) and 7(B), so that a load having a larger width than the loads D2, D3 can be mounted on the vehicle.

The detachable mechanism 80 consists of a simple latch structure, and can be thus used as a hinge with high reliability, while making it considerably easy to attach and detach the seat cushion 10b to and from the floor 31.

To return the seat cushion 10b to the seating position, the above-described operations can be carried out in the reverse order.

In the seat structure of the present invention as explained above, where the rear seat (2) is a split-type seat consisting of a first section on the side of the front driver's seat which accounts for 60% of the entire rear seat, and a second section on the side of the front passenger's seat which accounts for 40% of the entire rear seat and whose width is substantially equal to that of the front seat (1), for example, the seat cushion 10a on the side of the front passenger's seat is flipped over and accommodated in the space 32c just above the floor panel 32, so as to easily provide a full flat reclining seat consisting of the eat cushion 35a, seat back 34a' and seat back 33a'. On the other and, the seat cushion 10b on the side of the front driver's seat, which reaches a substantially middle part of the interior compartment, cannot be flipped over and accommodated in the space 32c just above the floor panel 32, in the presence of the console box 120 or the like located in the middle part of the interior compartment. If the seat cushion 10b is made detachable as described above, a full flat reclining seat consisting of the seat cushion 35b, seat back 34b' and seat back 33b' can be similarly easily formed by removing the seat cushion 10b. Thus, the seat structure of the motor vehicle may be used in various ways depending upon the use of the seats, even if the seat structure includes the rear seat (2) that is divided into two sections in the ratio of 6:4.

While the rear seat (2) is split in the width direction of the vehicle into two sections in the ratio of 6:4 in the illustrated embodiments, the rear seat (2) is not limited to this type, but may be constructed such that the seat cushion and seat back are divided into three sections in the ratio of 4:2:4. Namely, the seat cushion and seat back facing the back face of the front passenger's seat accounts for 40% of the entire rear seat, and the seat cushion and seat back facing the back face of the front driver's seat also accounts for 40% of the entire rear seat, so that both of these seat cushions may be flipped over and accommodated in the space 32c just above the floor panel 32. In this case, only the middle portion (accounting for 20% of the entire rear seat) of the rear seat may be made detachable or removable as described above, since this portion might interfere with the console box 120 or the like if it is flipped over. If the middle portion does not interfere with anything, this portion need not be removed.

What is claimed is:

1. A seat structure for a motor vehicle comprising:

a rear seat having, a rear seat cushion pivotably supported by a vehicle body through a pivotal support member provided in a front end portion thereof, said rear seat cushion being rotatable about the pivotal support member between a first position in which said rear seat cushion is placed on a rear seat cushion floor, and a second position in which said rear seat cushion is placed above a floor panel in front of the rear seat to form a first surface, and a rear seat back, at least a part of which reclines forward to form a second surface, said first surface being substantially lower than the second surface, when said rear seat cushion is in said second position; and a front seat having a front seat back that reclines rearward to form a third surface above said first surface, the third surface being substantially level and continuous with the second surface, wherein said pivotal support member has a double hinge structure including a first hinge provided on a raised portion that extends from the floor panel in front of the rear seat to the rear seat cushion floor that normally bears said rear seat cushion, and a second hinge provided in said front end portion of the rear seat cushion, said first hinge is directly supported by said raised face, while said second hinge being supported by a support member rotatable about said first hinge such that a radius of rotation about said second hinge is smaller than a radius of rotation about said first hinge, and a lock mechanism is provided between said support member and said second hinge for selectively restricting rotation of said rear seat cushion about said second hinge, wherein said rear seat cushion rotates about said first hinge between said first position and a third position, located between said first and second positions, while said lock mechanism restricts rotation about said second hinge, rotates about said second hinge between said third position and a fourth position, located between said third and second positions, and rotates about said first hinge between said fourth and second positions.

2. A seat structure for a motor vehicle according to claim 1, wherein each of said rear seat cushion and said rear seat back of the rear seat are divided in a width direction of the vehicle into at least two portions arranged in parallel with each other, and wherein a part of the divided rear seat cushion is rotatably supported at a front end portion thereof by the vehicle body through said pivotal support member, and a remaining part of the rear seat cushion is supported by the vehicle body through a detachable connecting member provided in a front end portion of the rear seat cushion.

3. A seat structure for a motor vehicle according to claim 1, wherein said seat cushion and said seat back of the rear seat is divided in a width direction of the vehicle into at least two sections that are arranged in parallel with each other, a part of the divided seat cushion being rotatable independently to be flipped over and stored above said floor panel in front of the rear seat, a part of said seat back corresponding to said part of the seat cushion being capable of reclining forward independently.

4. A seat structure for a motor vehicle according to claim 1, wherein said third position is where said rear seat cushion is substantially vertical.

5. A seat structure for a motor vehicle according to claim 1, wherein said fourth position is where said rear seat cushion is substantially horizontal.

* * * * *